US012710632B2

(12) United States Patent
Lapid

(10) Patent No.: US 12,710,632 B2
(45) Date of Patent: Aug. 18, 2026

(54) COUPLING MIRROR OF AN OPTICAL INSPECTION SYSTEM

(71) Applicant: Applied Materials Israel Ltd., Rehovot (IL)

(72) Inventor: Menachem Lapid, Hashmonaim (IL)

(73) Assignee: Applied Materials Israel Ltd., Rehovot (IL)

( * ) Notice: Subject to any disclaimer, the term of this patent is extended or adjusted under 35 U.S.C. 154(b) by 214 days.

(21) Appl. No.: 18/233,833

(22) Filed: Aug. 14, 2023

(65) Prior Publication Data

US 2025/0060573 A1 Feb. 20, 2025

(51) Int. Cl.
*G02B 21/00* (2006.01)

(52) U.S. Cl.
CPC ................................ *G02B 21/0032* (2013.01)

(58) Field of Classification Search
CPC ... G02B 21/0032; G02B 21/084; G02B 21/10
See application file for complete search history.

(56) References Cited

U.S. PATENT DOCUMENTS

| | | | | |
|---|---|---|---|---|
| 5,293,538 A * | 3/1994 | Iwata | G01N 21/8806 | 356/239.1 |
| 2008/0153125 A1* | 6/2008 | Buttry | C12Q 1/04 | 435/308.1 |
| 2011/0141272 A1* | 6/2011 | Uto | G01N 21/95607 | 348/135 |
| 2016/0123892 A1* | 5/2016 | Cauwenberghs | G01N 21/8806 | 348/136 |
| 2017/0082425 A1* | 3/2017 | Minekawa | G01N 21/956 | |
| 2024/0023223 A1* | 1/2024 | Nishimura | H05G 2/0086 | |

* cited by examiner

*Primary Examiner* — Mustak Choudhury
(74) *Attorney, Agent, or Firm* — Lowenstein Sandler LLP

(57) ABSTRACT

A system for scanning a surface including: an illumination system providing inspection light for illumination of a field of view (FOV) on an inspection object to produce a reflected light beam from the inspection object; an objective lens arrangement, located between the illumination system and the surface; a light separator: having a reflective surface arranged: to direct the inspection light towards the FOV; and to receive and change a direction of brightfield light comprising a central portion of the reflected light beam; and sized and shaped to allow therearound darkfield light comprising a peripheral portion of the reflected light beam; a holder configured to provide mechanical support to the light separator, having a first portion attached to the light separator and a second portion extending away from the light separator.

19 Claims, 10 Drawing Sheets

100
102
104
190
178
126
142
152
124
121
128
124
120
114
$\theta$
106
110
141
122
112
146
118
144
134
116
x
y
z

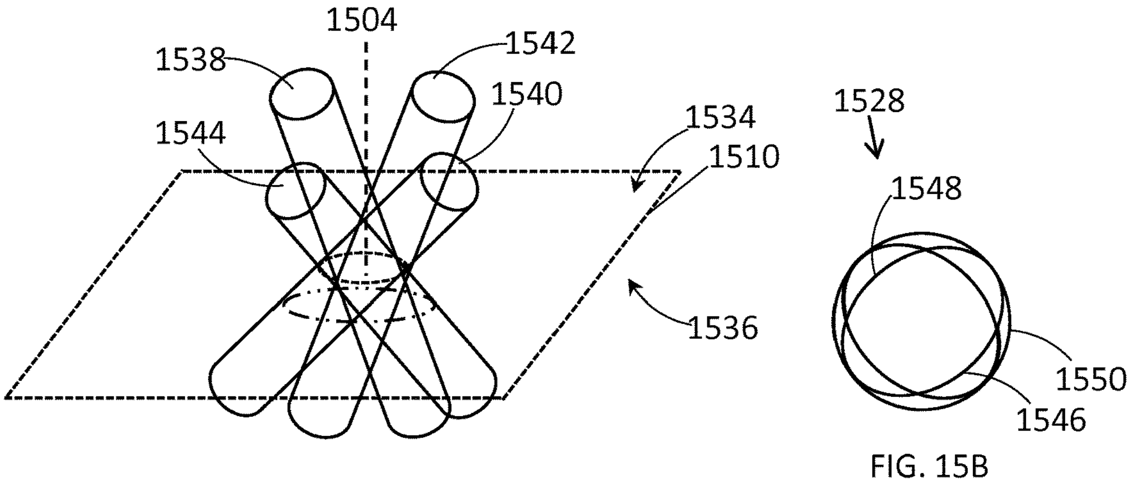
FIG. 15A
FIG. 15B
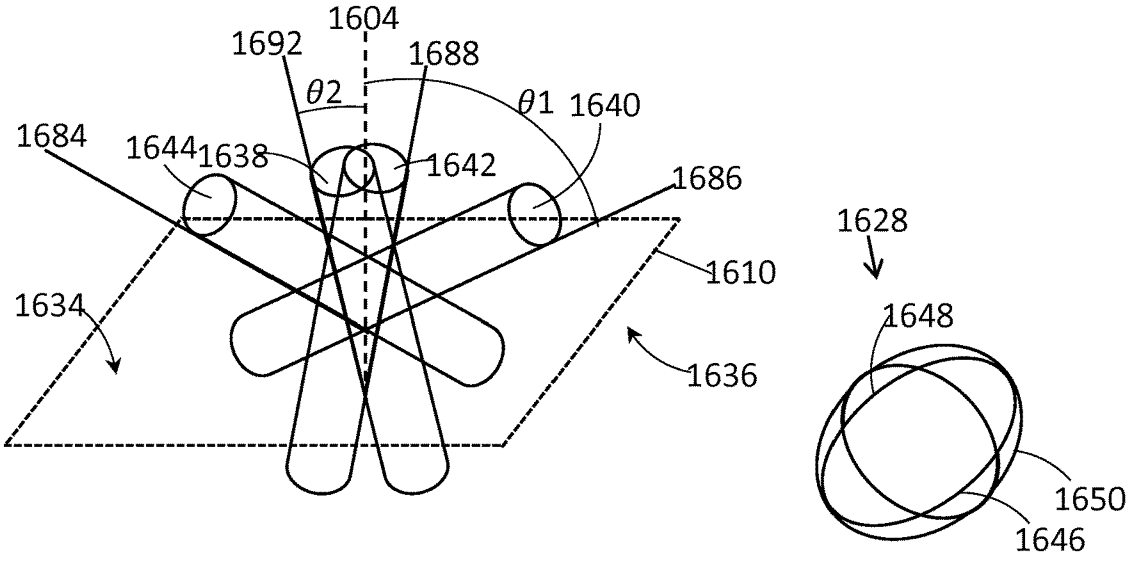
FIG. 16A
FIG. 16B
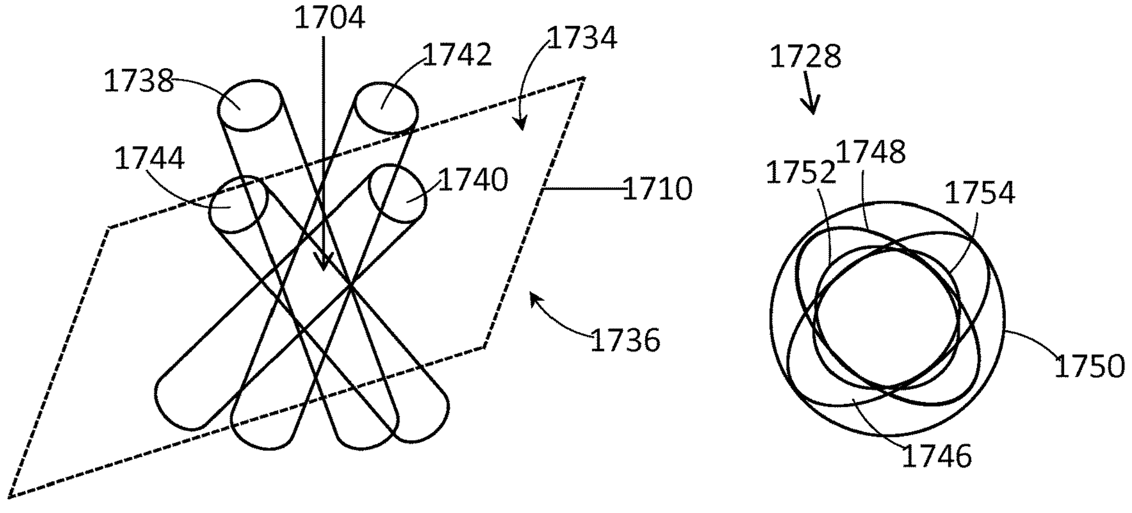
FIG. 17A
FIG. 17B

COUPLING MIRROR OF AN OPTICAL INSPECTION SYSTEM

TECHNOLOGICAL FIELD

The present disclosure, in some embodiments, thereof, relates to an optical inspection system and, more particularly, but not exclusively, to a coupling mirror of the optical inspection system.

BACKGROUND ART

Acknowledgement of the above references herein is not to be inferred as meaning that these are in any way relevant to the patentability of the presently disclosed subject matter.

GENERAL DESCRIPTION

Following is a non-exclusive list of some exemplary embodiments of the disclosure. The present disclosure also includes embodiments which include fewer than all the features in an example and embodiments using features from multiple examples, even if not listed below.

Example 1. A system for scanning a surface comprising:

- an illumination system providing inspection light for illumination of a field of view (FOV) on an inspection object to produce a reflected light beam from said inspection object;
- an objective lens arrangement, located between said illumination system and said surface;
- a light separator:
  - having a reflective surface arranged:
    - to direct said inspection light towards said FOV; and
    - to receive and change a direction of brightfield light comprising a central portion of said reflected light beam; and
  - sized and shaped to allow therearound darkfield light comprising a peripheral portion of said reflected light beam;
- a holder configured to provide mechanical support to said light separator, having a first portion attached to said light separator and a second portion extending away from said light separator.

Example 2. The system according to Example 1, wherein said

- an objective lens arrangement is configured to:
  - receive and transfer said inspection light to said inspection object;
  - collect light reflected off a plurality of field points on said inspection object to form and onwardly transmit said reflected light beam from the collected light.

Example 3. The system according to any one of Examples 1-2 wherein said reflective surface is disposed at a front side of said separator wherein said holder is attached at a back side of said separator.

Example 4. The system according to any one of Examples 1-3, wherein said second portion is coupled to an actuator configured to move said holder to move said light separator and positioned outside a region of space occupied by said darkfield light.

Example 5. The system according to Example 4, wherein said actuator is configured to change one or more of a position of said light separator and an orientation of said light separator.

Example 6. The system according to any one of Examples 1-5, wherein said holder extends away from said light separator in a direction parallel to a central optical axis of said darkfield light.

Example 7. The system according to any one of Examples 1-6, wherein said holder is contained within a volume delineated by said darkfield light after passage of said darkfield light around said separator.

Example 8. The system according to any one of Examples 6-7, comprising a darkfield channel reflector configured to direct said darkfield light towards a darkfield light detection unit, which reflector having a contained region contained by a darkfield region of said reflector which is illuminated by said darkfield light;

- wherein said second portion of said holder includes a portion disposed at said contained region.

Example 9. The system according to Example 8, wherein said darkfield channel reflector comprises a channel therethrough disposed at said contained region;

- wherein said holder extends through said channel, said second portion extending through said darkfield channel reflector.

Example 10. The system according to any one of Examples 6-8, wherein an angle of said light separator is a minimal angle which directs said brightfield light on an unobscured path towards a brightfield detector.

Example 11. The system according to any one of Examples 1-5, wherein said holder is elongate having a central longitudinal axis disposed at a non-perpendicular angle to said reflective surface of said separator.

Example 12. The system according to any one of Examples 1-5, wherein said holder is elongate having a central longitudinal axis is aligned with an orientation of said reflective surface of said separator.

Example 13. The system according to any one of Examples 1-12, wherein said light separator has a body where said body tapers in a direction away from said reflective surface.

Example 14. The system according to any one of Examples 2-13,

- wherein said light separator comprises a body including:
  - a front surface which hosts said reflective surface;
  - a forward edge; and a back edge;
- wherein said front surface of said separator is angled with respect to said objective lens arrangement, to position said front surface closer to said objective lens arrangement than said back edge;
- wherein said forward edge is angled away from said front surface.

Example 15. The system according to Example 14, wherein an angle of said forward edge to said front surface is less than 90 degrees.

Example 16. The system according to any one of Examples 1-5, wherein said holder comprises transmissive material.

Example 17. The system according to Example 16, wherein said holder extends around said reflective surface so darkfield light passes through said transmissive material of said holder.

Example 18. The system according to any one of Examples 16-17, wherein said separator and holder are formed of a sheet of transmissive material, where a portion of said sheet hosts reflective material to form said reflective surface.

Example 19. The system according to any one of Examples 1-18, wherein said reflective surface has a shape defined as a geometric intersection area between a model of said illumination light and said reflective surface.

Example 20. The system according to Example 19, comprising a relay module configured to relay said light source pupil to said reflective surface;

wherein said illumination system has:

a field of view (FOV);

a light source pupil having a size and a shape;

a central optical axis; and one or more field angle defining a shape of said FOV extending away from said light source pupil;

wherein said model includes a plurality of solids each solid having a cross section of said light source pupil and angled to a field angle of said one or more field angle.

Example 21. The system according to Example 20, wherein said reflective surface is enlarged from said geometric intersection volume, enlargement based on one or more tolerance.

Example 22. The system according to Example 21, wherein said one or more tolerance includes an error in positioning of said light source pupil at said reflective surface by said relay module.

Example 23. The system according to Example 22, wherein said one or more tolerance comprises a relay module magnification error.

Example 24. The system according to any one of Examples 22-23, wherein said one or more tolerance comprises a relay module centricity error.

Example 25. The system according to any one of Examples 22-24, wherein said one or more tolerance comprises an error in said size and/or shape of said light source pupil.

Example 26. The system according to any one of Examples 21-25, comprising:

an optical reflective microscope; and an objective lens arrangement configured to receive and transfer said inspection light to said inspection object;

collect light reflected off a plurality of field points on said inspection object to form and onwardly transmit said reflected light beam from the collected light;

wherein said objective lens arrangement includes:

an objective; and a plurality of interchangeable telescopes coupled thereto to control a magnification and a numerical aperture of said optical reflective microscope, the objective lens arrangement being configured to collect light reflected off a plurality of field points on the surface and to onwardly transmit a light beam formed from the collected light; and wherein said one or more tolerance comprises one or more error associated with positioning of said interchangeable telescopes.

Example 27. The system according to any one of Examples 21-26, wherein said one or more tolerance comprises an error in said one or more field angle.

Example 28. The system according to any one of Examples 21-27, wherein said one or more tolerance comprises error in light separator geometry and/or position.

Example 29. The system according to any one of Examples 21-28, wherein said one or more tolerance comprises error in centering of said separator to said illumination light.

Example 30. The system according to any one of Examples 21-29, wherein said one or more tolerance comprises error in relay of said light source pupil associated with aberration in said relay module.

Unless otherwise defined, all technical and/or scientific terms used within this document have meaning as commonly understood by one of ordinary skill in the art/s to which the present disclosure pertains. Methods and/or materials similar or equivalent to those described herein can be used in the practice and/or testing of embodiments of the present disclosure, and exemplary methods and/or materials are described below. Regarding exemplary embodiments described below, the materials, methods, and examples are illustrative and are not intended to be necessarily limiting.

Some embodiments of the present disclosure are embodied as a system, method, or computer program product. For example, some embodiments of the present disclosure may take the form of an entirely hardware embodiment, an entirely software embodiment (including firmware, resident software, micro code, etc.) or an embodiment combining software and hardware aspects that may all generally be referred to herein as a "circuit," "module" and/or "system."

Implementation of the method and/or system of some embodiments of the present disclosure can involve performing and/or completing selected tasks manually, automatically, or a combination thereof. According to actual instrumentation and/or equipment of some embodiments of the method and/or system of the present disclosure, several selected tasks could be implemented by hardware, by software or by firmware and/or by a combination thereof, e.g. using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computational device e.g. using any suitable operating system.

In some embodiments, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage e.g. for storing instructions and/or data. Optionally, a network connection is provided as well. User interface/s e.g. display/s and/or user input device/s are optionally provided.

Some embodiments of the present disclosure may be described below with reference to flowchart illustrations and/or block diagrams. For example illustrating exemplary methods and/or apparatus (systems) and/or and computer program products according to embodiments of the present disclosure. It will be understood that each step of the flowchart illustrations and/or block of the block diagrams, and/or combinations of steps in the flowchart illustrations and/or blocks in the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart steps and/or block diagram block or blocks.

These computer program instructions may also be stored in a computer readable medium that can direct a computer (e.g. in a memory, local and/or hosted at the cloud), other programmable data processing apparatus, or other devices to function in a particular manner, such that the instructions stored in the computer readable medium can be used to produce an article of manufacture including instructions which implement the function/act specified in the flowchart and/or block diagram block or blocks.

The computer program instructions may also be run by one or more computational device to cause a series of operational steps to be performed e.g. on the computational device, other programmable apparatus and/or other devices to produce a computer implemented process such that the instructions which execute provide processes for implementing the functions/acts specified in the flowchart and/or block diagram block or blocks.

Some of the methods described herein are generally designed only for use by a computer, and may not be feasible and/or practical for performing purely manually, by a human expert. A human expert who wanted to manually perform similar tasks, might be expected to use different methods, e.g. making use of expert knowledge and/or the pattern recognition capabilities of the human brain, potentially more efficient than manually going through the steps of the methods described herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1D is a simplified schematic of a separator, according to some embodiments of the disclosure;

FIG. 1E is a simplified schematic of a separator, according to some embodiments of the disclosure;

FIG. 1F is a simplified schematic of a separator, according to some embodiments of the disclosure;

FIG. 11 is a simplified schematic cross section of a portion of an inspection system, according to some embodiments of the disclosure.

FIG. 12 is a method of coupling mirror window design, according to some embodiments of the disclosure;

FIGS. 13C-4D illustrate modeling of illumination light, according to some embodiments of the disclosure;

FIG. 15A is a simplified schematic illustrating modelling of illumination light as it interacts with a plane delineating position of a reflective surface of coupling mirror, according to some embodiments of the disclosure;

FIG. 15B illustrates a shape at a surface plane of a plane delineating position of a reflective surface of coupling mirror, according to some embodiments of the disclosure;

FIG. 16A is a simplified schematic illustrating an extent of illumination light as it interacts with a plane delineating position of a reflective surface of coupling mirror, according to some embodiments of the disclosure;

FIG. 16B illustrates a shape at a surface plane of a plane delineating position of a reflective surface of coupling mirror, according to some embodiments of the disclosure;

FIG. 17A is a simplified schematic illustrating modelling of illumination light as it interacts with a plane delineating position of a reflective surface of coupling mirror, according to some embodiments of the disclosure;

FIG. 17B illustrates a shape at a surface plane of a plane delineating position of a reflective surface of coupling mirror, according to some embodiments of the disclosure;

In some embodiments, although non-limiting, in different figures, like numerals are used to refer to like elements, for example, element 110 in FIG. 1 corresponding to element 210 in FIG. 2.

DETAILED DESCRIPTION OF EMBODIMENTS

Figure 1A:
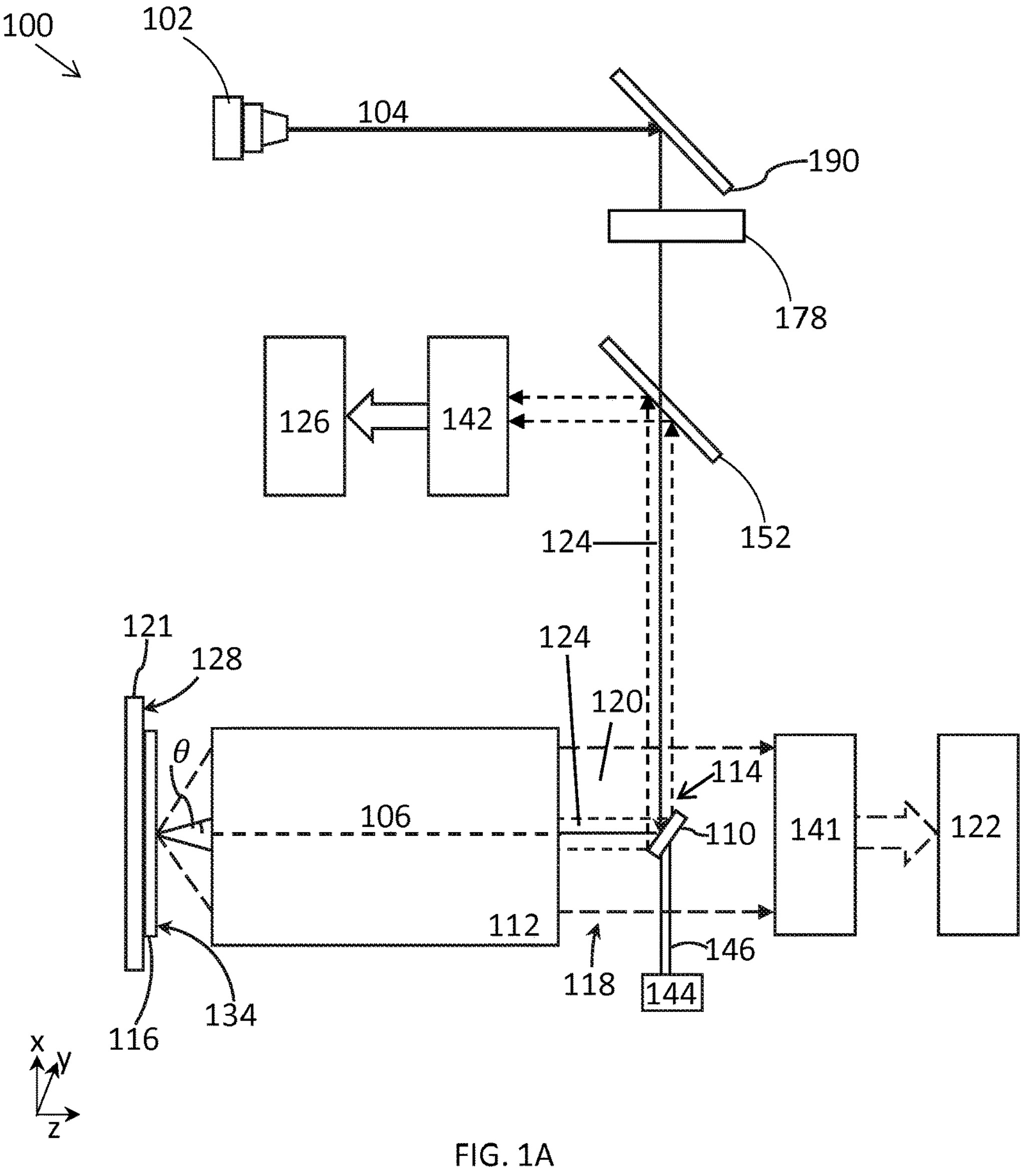
FIG. 1A is a simplified schematic of an inspection system, according to some embodiments of the disclosure.

The present disclosure, in some embodiments, thereof, relates to an optical inspection system and, more particularly, but not exclusively, to a coupling mirror of the optical inspection system.

Overview

A broad aspect of some embodiments of the disclosure relates to a light separator of a wafer inspection system, the light separator having a reflective surface configured to both direct illumination light towards an inspection object (e.g. via an objective lens arrangement) and to direct brightfield light reflected from said inspection object e.g. towards a brightfield light detector. Where the light separator is sized and/or shaped to allow passage to darkfield light around the light separator e.g. towards a darkfield light detector.

A potential benefit of a light separator directing brightfield light (e.g. as opposed to darkfield light) is a potentially smaller reflective surface for the light separator and, optionally, a smaller body of the light separator. A small light separator potentially is easier to accurately position. A light separator having a small body potentially enables closer positioning of elements of the wafer inspection system e.g. for a more compact system.

A potential benefit of reflection of illumination light by the separator is that the brightfield light interacts with a surface (e.g. and not with a separator volume e.g. as with a separator having a transmissive region through which illumination light passes).

A potential benefit of reflection of illumination light by the separator is that a larger portion of scattered of light e.g. at edges of the separator is directed away from the inspection surface e.g. as opposed to a system where the separator is formed by a hole, scattering at edges of the hole potentially resulting in "forward scattered light" which arrives at the inspection object behind the hold. Potentially, less issues with scattered light enables a smaller mirror and a higher proportion of transmitted darkfield light. The reduction in scattering meaning that, in some embodiments, the mirror surface is not enlarged or is minimally enlarged outside a theoretical cross sectional meeting area of the illumination light pupil and the mirror surface to prevent scattering.

A broad aspect of some embodiments of the disclosure relates to providing mechanical support to the light separator where the mechanical support minimally interrupts the passage around the light separator of darkfield light.

In some embodiments, a holder is attached to the light separator and extends away from the light separator e.g. to attachment at elements outside light paths e.g. of one or both of the illumination light and the light reflected and collected from the inspection object.

In some embodiments, a position and/or orientation of the light separator is adjusted by adjustment of the holder. For example, in some embodiments, the holder is coupled (e.g. outside the light path/s) to one or more actuator configured to position (e.g. move and/or orient) the light separator.

Where positioning and/or movement of the light holder, in some embodiments, includes lateral movement and/or tilting e.g. to change an angle of the reflective surface of the separator. Where the lateral movement and/or tilting is with respect to light path/s within the system (e.g. with respect to illumination light) and/or with respect to other optical element/s of the system e.g. the objective lens arrangement.

In some embodiments, position of the handle is selected to position the holder at and/or parallel to light pupil/s. An advantage of which is reduction of effect of the holder on uniformity of light transmission and/or detection. In some embodiments, a portion of light beam/s corresponding to the size and/or shape of the holder are blocked before arrival at the holder e.g. to minimize holder effect on light transmission and/or detection uniformity. In some embodiments, the holder is attached to a back surface of the light separator (the reflective surface being disposed on a front surface of the light separator). Where, in some embodiments, the holder extends away from the light separator in a shadow of the light separator. Where the shadow is a region of space behind the light separator in a direction of transmission from an objective lens arrangement of light reflected from the inspection object. Where the "shadow" is in a region contained (e.g. at least partially surrounded) by darkfield light.

In some embodiments, darkfield light is directed away from the optical axis, after passing around the light separator, for example, by a second reflector element (also herein termed "darkfield reflector").

In some embodiments, the holder extends from attachment to the light separator, within the shadow of the light separator to the darkfield reflector. In some embodiments, the holder extends through the darkfield reflector e.g. through a channel therein.

In some embodiments, the holder includes (e.g. is formed of e.g. at least in a region of space of the reflected light) material configured to allow passage therethrough of darkfield light e.g. transparent material. In some embodiments, the transparent material introduces a small wavefront error to the darkfield light.

In some embodiments, the holder includes anti-reflective properties e.g. an anti-reflection coating. Where, the holder either allows passage therethrough (e.g. without reflection) of darkfield light or the holder absorbs the darkfield light without introducing noise associated with reflection of the darkfield light by the holder.

In some embodiments, the holder is sized and/or shaped (e.g. having a cross section at regions of interaction between the holder and reflected light) to minimize total internal reflection of light within the holder.

In some embodiments, an angle of the light separator with respect to other element/s e.g. the optical axis of the objective lens arrangement, is minimized e.g. to reduce a space required between the objective lens arrangement and the darkfield reflector. Where, a minimal angle, in some embodiments, is required for direction of the illumination and/or brightfield light.

A broad aspect of some embodiments of the disclosure relates to minimizing a size of a reflective region in a light separator of an optical inspection system so that the reflective region best fits illumination light for inspection of an object. The light separator then, potentially, minimally truncating darkfield light which passes therearound travelling to a darkfield detector.

An aspect of some embodiments of the disclosure relates to designing the reflective region shape by determining an overlap surface between source illumination light of the inspection system and the separator (also herein termed "coupling mirror"). The determining, in some embodiments, assuming that the illumination light pupil is relayed to the coupling mirror. In some embodiments, the overlap surface is enlarged to account for alignment error/s between the source illumination pupil and the surface.

Referring now to an exemplary system where beams of illumination light are directed to different portions of a field of view (FOV) to scan an object to be inspected. Each beam of illumination light, in some embodiments, has a cross section corresponding to the illumination source entrance pupil and travels at an angle which corresponds to a field point on the object to be inspected. In some embodiments, the most highly angled beams e.g. corresponding to edges of the illumination FOV and/or edges of an inspection FOV are used to determine the overlap surface.

Referring now to an exemplary system with aerial illumination, marginal rays of the illumination correspond to edges of the illumination FOV and/or edges of the inspection FOV. Where, in some embodiments, the overlap surface is determined using the overlap surface of the mirror with solid shapes having cross section of the illumination source pupil and positioned with their edges following marginal rays of the illumination. Where, the solid shapes, in some embodiments, correspond with the most highly angled beams of the exemplary scanning light system.

In some embodiments, the reflective surface of the coupling mirror is designed by enlarging the determined overlap surface e.g. to account for error/s in the system and/or non-ideal nature of components. For example as they effect the size of the overlap.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary System

FIG. 1A is a simplified schematic of an inspection system 100, according to some embodiments of the disclosure.

Figure 1B:
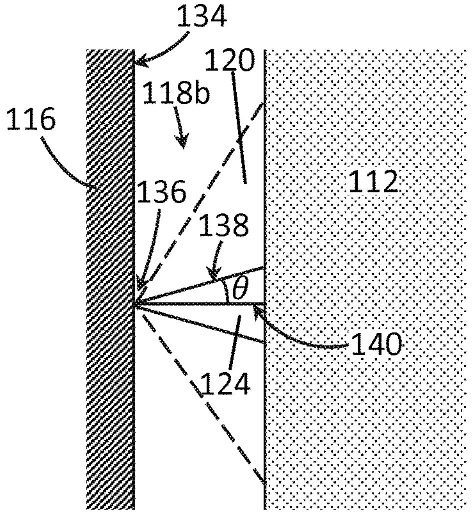
FIG. 1B is a simplified schematic of a portion of an inspection system, according to some embodiments of the disclosure.

FIG. 1B is a simplified schematic of a portion of an inspection system, according to some embodiments of the disclosure.

Figure 1C:
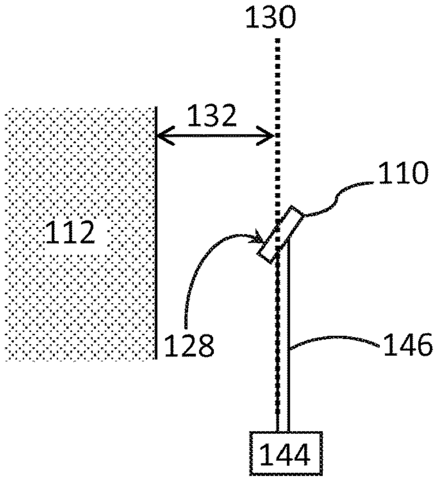
FIG. 1C is a simplified schematic of a portion of an inspection system, according to some embodiments of the disclosure.

FIG. 1C is a simplified schematic of a portion of an inspection system, according to some embodiments of the disclosure.

In some embodiments, FIGS. 1B-C illustrate portions of system 100 FIG. 1A.

In some embodiments, inspection system 100 is a semiconductor wafer and/or mask inspection system, for example, used to inspect one or more of defects, particles, and patterns on a surface e.g. a surface of an object 116 and/or specimen for inspection (hereinafter termed "object", also termed "substrate") e.g. as part of a quality assurance process in semiconductor manufacturing processes.

Inspection system 100, in some embodiments, includes a platform 121 for receiving and/or securing object 116. Platform 120, in some embodiments, is stationary or, in some embodiments, is a moveable stage. For example, in some embodiments, platform 121 includes a stage mechanism (not illustrated) configured to move platform 121 in a longitudinal direction (along and/or in a same direction as an optical axis 106 of an objective lens arrangement 112 which is described hereinbelow) and/or in a transverse direction (x- and/or y-axis of FIG. 1) e.g. in the same plane as platform 121 top surface 128.

In some embodiments, inspection system 100 includes a light source 102 for illuminating object 116.

In some embodiments, light source 102 is a single point source (e.g. a laser) that illuminates a single point on the object.

In some embodiments, a stage mechanism (not illustrated) is configured to move in coordination with a scanning sequence for light source 102 e.g. to enable object 116 placed on platform 121 to be scanned by the light source 102.

In some embodiments, light source 102 includes an array of point sources that illuminates multiple points on the object simultaneously (e.g. to make system 100 capable of collecting information from multiple locations on the object simultaneously).

In some embodiments, light source 102 includes an aerial illumination source which illuminates a continuous area.

FIG. 1A illustrates illumination light 104 provided by illumination source 102 as a single ray. In some embodiments, at least a portion of light 104 provided by light source 102 arrives to illuminate object 116.

Optionally, in some embodiments, system 100 includes one or more reflector. For example, a reflector 190 positioned along optical axis 106 of the objective lens arrangement 112 (also herein termed "objective" and/or "objective module") to direct a light beam or multiple light beams from the light source 102 (through the objective lens arrangement 112, described hereinbelow) towards the platform 121. Reflector 190, in some embodiments, enabling light source 102 to be placed off optical axis 106 of the objective lens arrangement 112, for example, to reduce a size of system 100.

Referring now to FIG. 1B which, in some embodiments, is a magnified view of a portion of FIG. 1A, illustrating reflected illumination light 118 reflected off a point 136 on object 116. Where, in some embodiments, light 118 is regarded as forming a cone 138 originating from point 136 with a chief ray or a centroid ray perpendicular to the surface of the object being a central axis 140 of cone 138.

In some embodiments, such a light cone 138 is characterized by a half angle θ defined with respect to central axis 140. In some embodiments, light within cone 138 is considered to be bright field (BF) light. Where, in the BF light signal, in some embodiments, uneven features of surface 134 of the object appear as dark features against a light background.

In some embodiments, light outside of cone 138, i.e. coming off point 136 at an angle greater than θ with respect to chief ray 140, is regarded as scattered light (also herein termed dark field (DF) light) which does not contain BF light or specular rays. For example where θ is an angle under which reflection is specular and/or over which the refection is not specular. Where, for example, DF light includes light scattered by uneven features, e.g. such as defects and/or particles, e.g. on the surface 134 of object 116.

Where, in some embodiments, light reflected 118*b* from surface 134 includes a specularly reflected portion 128 which, in some embodiments, is a central portion 124 of reflected light 118.

Referring back now to FIG. 1A, in some embodiments, to separate a DF light signal 120 from a BF light signal 124 (e.g. for separate detection thereof by detector apparatuses 122, 126) system 100 includes a light signal separator/divider 110 (also herein termed "coupling mirror", "coupling element", "mirror element").

Where separator 110, in some embodiments, directs BF light signal 124 to a BF detector apparatus 126 and allows passage of DF light signal 120 around separator 110 to a DF detector apparatus 122.

Light signal separator 110, in some embodiments, directing a portion 124 of a light beam 118 from objective lens arrangement 112, which comprises specularly reflected light reflected off the surface of the object (e.g. light within the angle θ and/or a central portion of light beam 118), while a portion of the light beam 120, which is non-specularly reflected from the surface of the object (e.g. light scattered off at an angle greater than θ and/or a peripheral portion of the light beam), passes around separator 110.

In some embodiments, inspection system 100 includes two imaging lenses or imaging lens arrangements 141, 142 which are hereinafter termed "imaging lens arrangement", where this term should be understood to include an imaging lens as well as an imaging lens arrangement.

In some embodiments, light detectors apparatuses 122, 126, are each respectively disposed behind an imaging lens arrangement of imaging lens arrangements 141, 142. Where, in some embodiments, detector apparatuses 122, 126 each detect an image formed by the respective imaging lens arrangements 141, 142. In some embodiments, detector arrays 122, 126 each include an optical detector e.g. including a camera and/or a detector array.

In some embodiments, each imaging lens arrangement 141, 142 and its corresponding light detector apparatus 122, 126, are arranged to detect a different portion of the light reflected from object 116 (e.g. and collected by the objective lens arrangement 112 e.g. as described hereinbelow). Light signal separator/divider 110, in some embodiments includes (e.g. is provided in the form of) a mirror/reflector (e.g. a plane mirror).

In some embodiments, (e.g. as illustrated in FIG. 1A) light signal separator/divider 110 is disposed at an angle (i.e. tilted) with respect to optical axis 106 of objective lens arrangement 112. For example, such that central portion 124 of the light (BF signal) is directed off the illumination optical axis 106, for example, enabling imaging lens arrangement 142 and DF detector apparatus 126 to be arranged off the optical axis.

Imaging lens arrangement 142 and corresponding detector apparatus 126, in some embodiment are arranged off optical axis 106 of the objective lens arrangement 112 e.g. through the use of e.g. a partially reflective element 152 that is transmissive on one side to allow transmission of light from the light source 102 while reflective on the opposite side to reflect BF signal 124 towards the BF detectors array 126.

It should be understood that illustrated positioning the imaging lens arrangements 141, 142 and/or detector apparatuses 122, 126 and/or light source 102 at an angle with respect to optical axis 106 of the objective lens arrangement 112 is optional and not essential to the present technology.

In some embodiments, inspection system 100 includes an objective lens arrangement 112. Including, for example, a plurality of optical elements e.g. including an objective lens and a telescope. Where objective lens arrangement 112, in some embodiments, receives and transfers light originating from light source 102 to object 116 and receives light returning (e.g. reflected and/or scattered e.g. BF signal 124 and/or DF signal light 120) from object 116 and transfers the returning light away from objective lens arrangement 112 e.g. to separator 110 and imaging lens arrangement 141.

In some embodiments, objective lens arrangement 112 is arranged to receive and collect light reflected from a plurality of field points on object 116 (e.g. light from the light source 102 reflected and/or scattered off a portion of the object, or transmitted through a portion of the object as in the case of a transmission microscope) and configured, in the present embodiment, for telecentric imaging at the object side.

In some embodiments, objective lens arrangement 112 is configured (e.g. element/s of the objective lens arrangement 112 are selected and/or arranged and/or aligned) such that light collected by the objective lens arrangement 112 from any given field point 136 on object surface 134 exits the objective lens arrangement 112, passing through an exit pupil 130 (illustrated in FIG. 1B as a dotted line), as parallel rays that are imaged at infinity.

Referring to FIG. 1C, in some embodiments (e.g. to maximize correct separation of BF and DF light by the separator) exit pupil 130 of objective lens arrangement 112 is positioned at a reflective surface of 128 of separator 110. Where, in some embodiments, objective lens arrangement 112 is configured (e.g. aligned) such that an exit pupil 130 thereof is relayed to a position external (e.g. instead of internal) to the objective lens arrangement 112 e.g. external to a housing of objective lens arrangement 112. For example, by providing a pupil relay module behind (e.g. within schematic illustration 112 of the objective lens arrangement) one or more lenses of objective lens arrangement 112.

The light signal separator/divider 110, in some embodiments, is positioned at the exit pupil 130 and arranged so reflective surface 128 of the separator 110 coincides with the objective exit pupil 130, laterally and axially. In other words, the system, in some embodiments, is theoretically configured such that an entrance pupil of the objective lens arrangement matches the exit pupil of the objective lens arrangement and the back focal plane of the objective lens arrangement.

In some embodiments (e.g. to maximize a proportion of illumination light which is passed by separator 110 to objective lens arrangement 112 e.g. while maximizing accurate separation of DF and BF light) source illumination 104 is focused to a region of surface 128 and/or to pupil 130 of objective lens arrangement. Where, in some embodiments, an illumination system including light source 102, relay module 178 (and optional reflector 190) form an afocal beam at an exit pupil thereof 114. The exit pupil 114 of the illumination system, in some embodiments, is matched to an entrance pupil of the objective lens arrangement. For example, by selection and/or alignment of relay module 178 elements.

In some embodiments, objective lens arrangement 112 has an optical axis 106, in FIG. 1A parallel to a z-axis. In some embodiments, optical axis 106 is perpendicular to a plane in which a top surface 128 of platform 121 extends.

In some embodiments, separator 110 reflective surface 128 is positioned at or near (i.e. contiguous with) exit pupil 130 of objective lens arrangement 112 (i.e. a theoretical position thereof e.g. determined using feature/s of optical elements of objective lens arrangement 112).

In some embodiments, separator 110 is held in position by a holder 146, which in some embodiments, extends into a region of space through which DF light 120 passes. Holder 146, in some embodiments, preventing a portion of DF light 120 from arriving at imaging lens arrangement 141.

In some embodiments, for example, as illustrated in FIG. 1A and FIG. 1C, holder 146 extends away from separator 110 in a general direction of illumination light (and of reflected darkfield light), for example, where a central longitudinal axis and/or external surface of holder 146 is oriented parallel to (or within 5-10 degrees or parallel to) a plane of the objective exit pupil 130. A potential benefit being minimal obscuring of the darkfield light e.g. as opposed to where holder 146 extends at a higher angle to the objective exit pupil 130 plane. A potential benefit being consistent obscuring of each part of the darkfield light by holder 146. For example, if holder 146 is angled with respect to exit pupil 130, different portions darkfield light 120 are obscured at different distances from the objective (each obscured distance having a different diffraction amount) potentially increasing complexity of extraction of information from the darkfield light.

Optionally, in some embodiments, a position and/or orientation of separator 110 is adjustable, for example, by one or more actuator 144. Where position, for example, includes a distance between separator and one or more other optical element e.g. objective 112 and/or one or more detection element/s 141, 152, 142. Where orientation includes an angle of reflective surface 128 with respect to other optical element/s and/or light beam/within the system e.g. illumination light 124 and/or BF light 124.

Where, in some embodiments, where actuator 144 is used to position separator 110 the virtual exit pupil of light source 102.

For example, to position the separator at a correct distance away from the light source in a direction of travel of the illumination light. For example, for fine positioning of separator 110 e.g. where relay 178, in some embodiments, roughly positions the virtual exit pupil at the separator 110 reflective surface.

Additionally, or alternatively (where relay 178 alone is sufficient for positioning the pupil at the separator) to position the separator laterally in a direction perpendicular to the direction of brightfield light e.g. to center the separator with respect to a center of the brightfield illumination and/or at a center of light received from objective 112.

FIG. 1D is a simplified schematic of a separator 110*d*, according to some embodiments of the disclosure.

FIG. 1E is a simplified schematic of a separator 110*e*, according to some embodiments of the disclosure.

In some embodiments, darkfield light clipping is affected by one or more of a thickness 160 of a separator body, an angle of the separator a with respect to an optical axis, and an angle, β1, β2 that a leading edge of the separator body presents to darkfield light 120.

FIGS. 1D-E illustrate dependency of darkfield light clipping on the separator body leading edge angle Γ1, β2. Where FIG. 1E with a smaller angle illustrates reduced clipping of darkfield light 120. In some embodiments, the leading edge angle is selected to be minimal while providing sufficient mechanical robustness, for example, a minimal angle for which the separator edge is not prone to chipping e.g. during incorporation (e.g. assembly) of the mirror to the system and/or during use of the separator.

FIG. 1F is a simplified schematic of a separator 110, according to some embodiments of the disclosure.

FIG. 1F illustrates a potential advantage of separators 110 e.g. as described within this document.

Where FIG. 1F illustrates an alternative configuration where a separator has a transmissive portion 110 for brightfield light 124 and a reflective portion 110*f* for darkfield light 120. Where, the separator having an extent corresponding to portion 110, in comparison, enables a more compact system (e.g. smaller distance between objective 112 and other portion/s of the system e.g. portion 141*f*) and/or a higher angle of the separator to reflected light 118.

Figure 2:
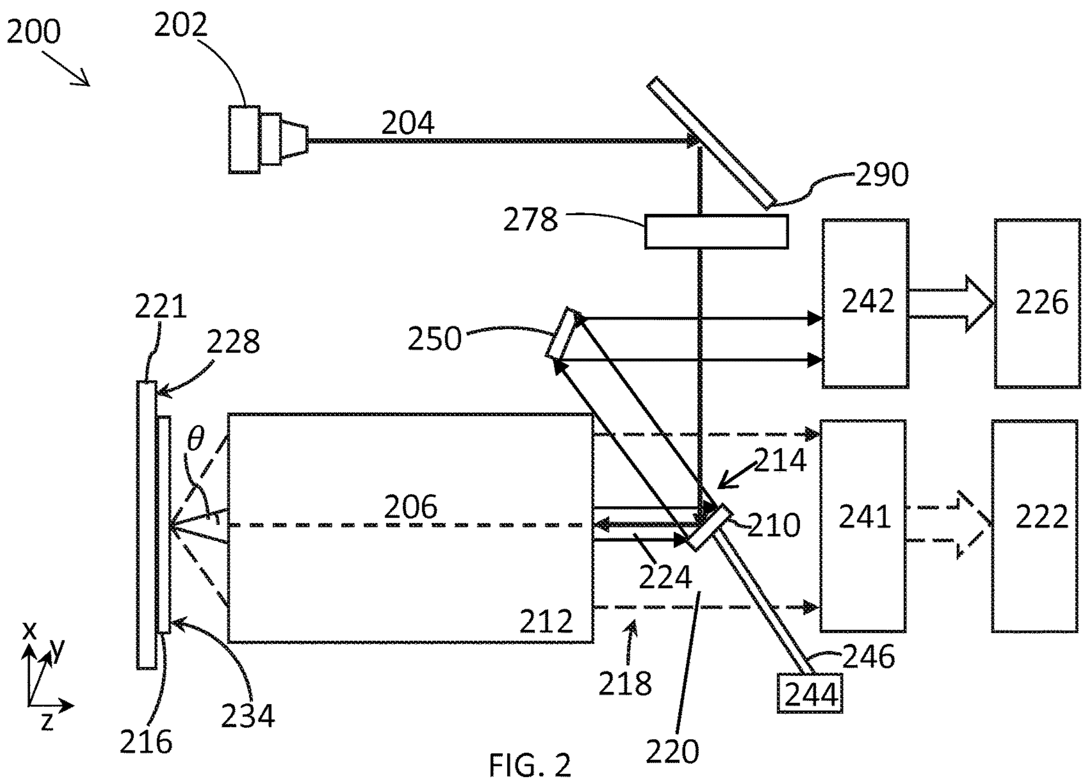
FIG. 2 is a simplified schematic of an inspection system, according to some embodiments of the disclosure.

FIG. 2 is a simplified schematic of an inspection system 200, according to some embodiments of the disclosure.

In some embodiments, system 200 includes one or more element of system 100 FIGS. 1A-D, where like elements have like numbers e.g. element 202 corresponding to element 102.

In some embodiments, system 200 includes one or more optical element 250 (e.g. including a mirror) configured to direct BF light 224 directed (e.g. away from an optical axis 206 of an objective lens arrangement 212) by a coupling mirror 210. Where, in some embodiments, optical element/s 250 direct BF light 224 to BF imaging lens arrangement 242.

In some embodiments, both BF and DF imaging lens arrangements 241, 242 are arranged at a same (or similar) position and/or orientation e.g. as enabled by element 250, a potential advantage being compactness of inspection system 200.

Figure 3:
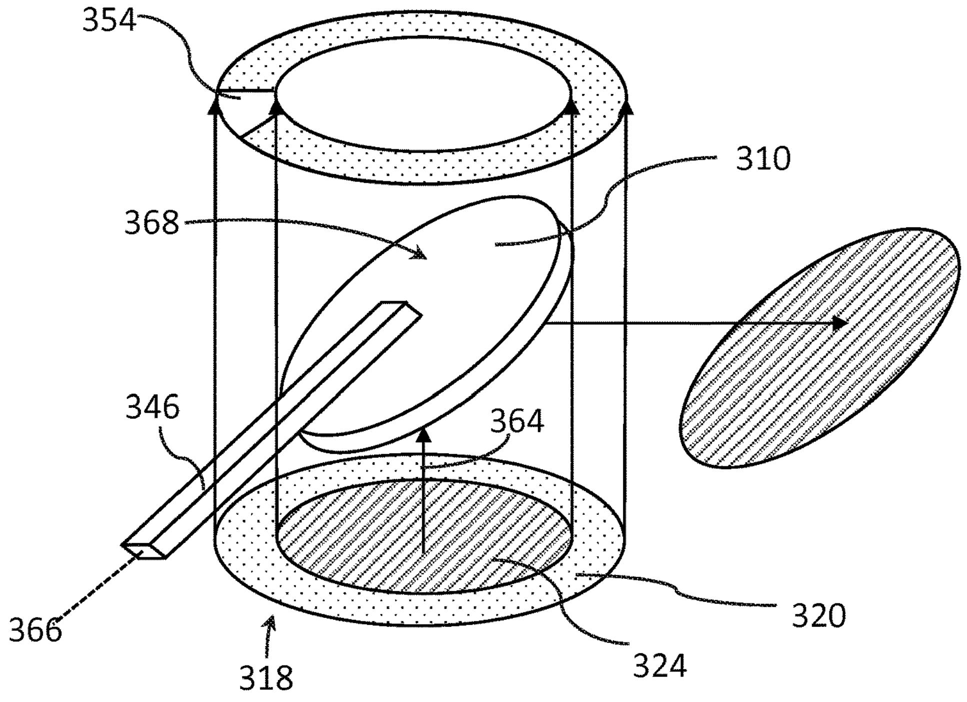
FIGS. 3-5 are simplified schematics of embodiments of portions of an inspection system, according to some embodiments of the disclosure.
Figure 4:
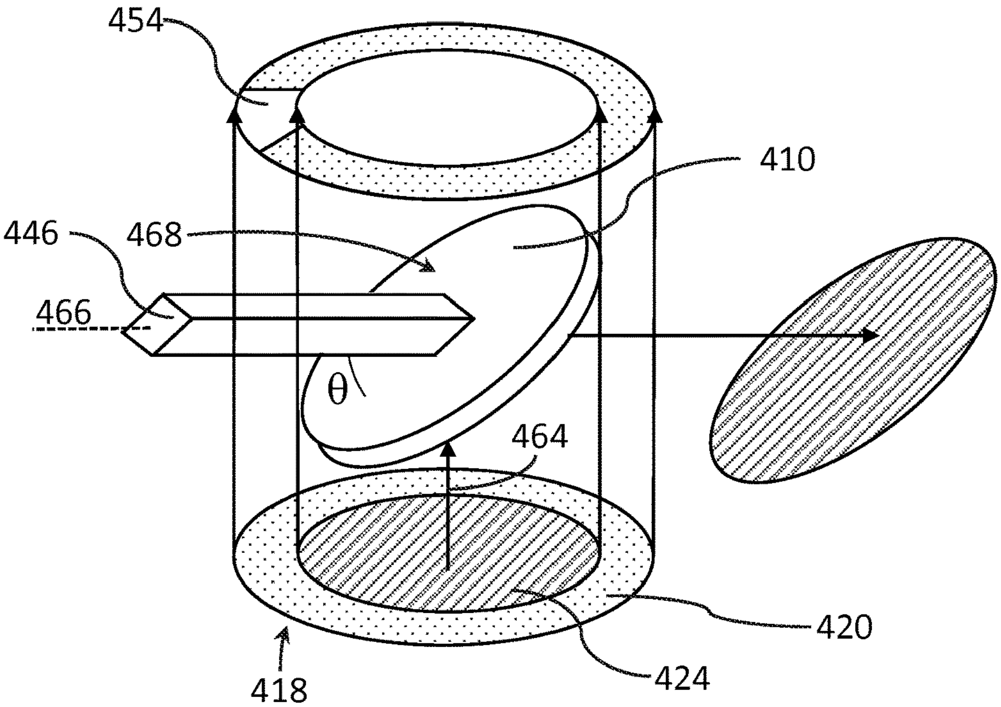
Figure 5:
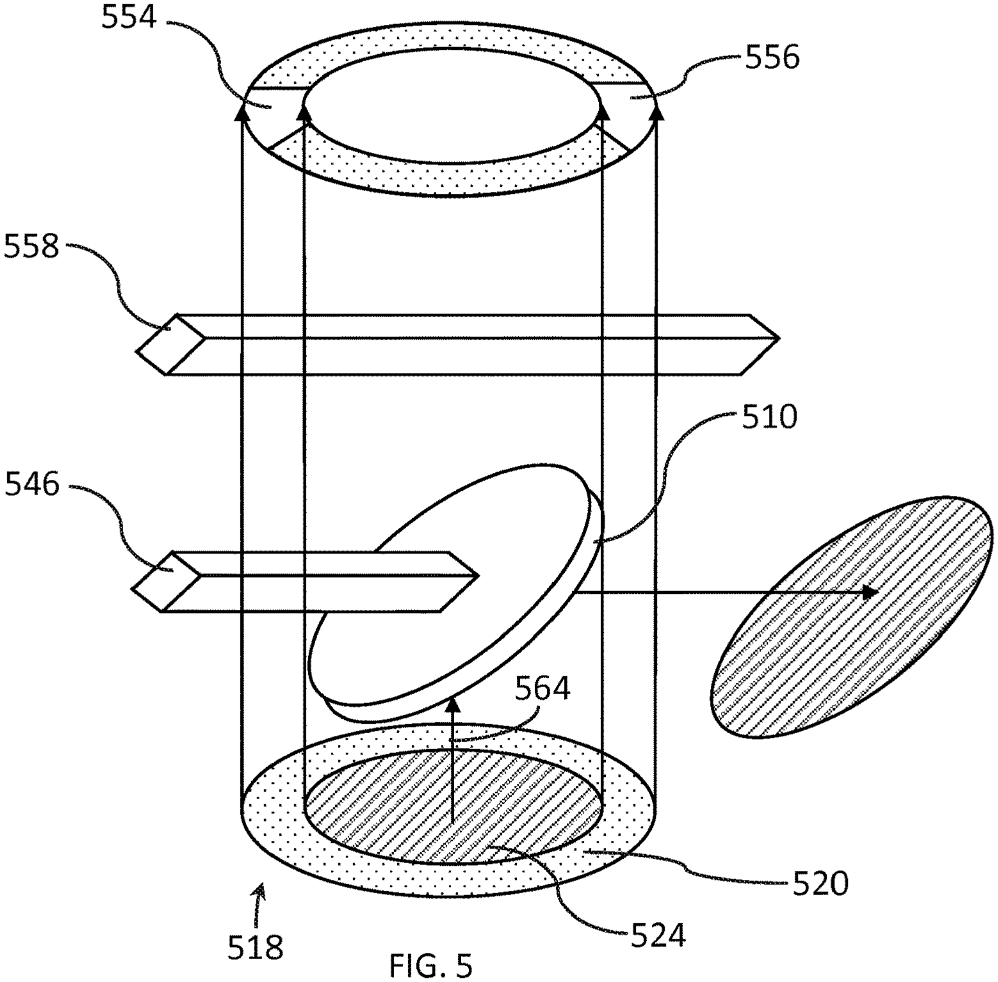

FIGS. 3-5 are simplified schematics of embodiments of portions of an inspection system, according to some embodiments of the disclosure.

Illustrated in FIGS. 3-5 are a coupling mirror 310, 410, 510, and a holder 346, 446, 546 for the coupling mirror. In some embodiments, FIGS. 3-5 illustrate interaction between reflected light 318, 418, 518 where coupling mirror 310, 410, 510 separates bright field (BF) light 324, 434, 534, and dark field (DF) light 320, 420, 520. Where, in some embodiments, DF light 320, 420, 520 passes around coupling mirror 310, 410, 510, and BF light is directed away from a direction 364, 464, 564 of propagation of reflected light 318, 418, 518.

FIG. 3 illustrates holder 346 disposed extending away from coupling mirror 310 in a direction including a component perpendicular to direction 364 of reflected light 318. Where, for example, holder 346 is elongate, where a central longitudinal axis 366 (also herein termed "axis of elongation) of holder 346 is parallel to a back surface 368 of coupling mirror 310. In some embodiments, an outer surface of a portion of holder 346 contacts and/or is connected to back surface 368. In some embodiments, holder 346 interacts with (e.g. blocks and/or absorbs) a portion 354 of DF light 320.

FIG. 4 illustrates holder 446 disposed extending away from coupling mirror 410 in a direction about perpendicular to direction 464 of reflected light 418. Where, for example, holder 446 is elongate, where a central longitudinal axis 466 (also herein termed "axis of elongation) of holder 446 extends away from a back surface 468 of coupling mirror 410 e.g. an angle θ between 20-90 degrees, or lower or higher or intermediate degrees or angles. In some embodiments, an outer surface of a portion of holder 446 contacts and/or is connected to back surface 468. In some embodiments, holder 446 interacts with (e.g. blocks and/or absorbs) a portion 454 of DF light 420.

FIG. 5 illustrates holder 546 aligned with a blocking element 558. Where, in some embodiments, an inspection system includes one or more blocking element 558 configured to block passage of a portion of DF light 520 e.g. to prevent the portion of light's arrival at detection apparatus (e.g. detection apparatus 122 FIG. 1).

Although blocking element 558 is illustrated as being adjacent to separator 510, in some embodiments, additionally or alternatively, holder 546 is aligned with a corresponding blocking element positioned to block a relayed image of darkfield light 520. For example, referring to FIG. 6 described hereinbelow, a corresponding blocking element is positioned on and/or incorporated into element 660 and/or positioned between element 660 and darkfield detection element 641 and/or between darkfield detection element 622.

Figure 6:
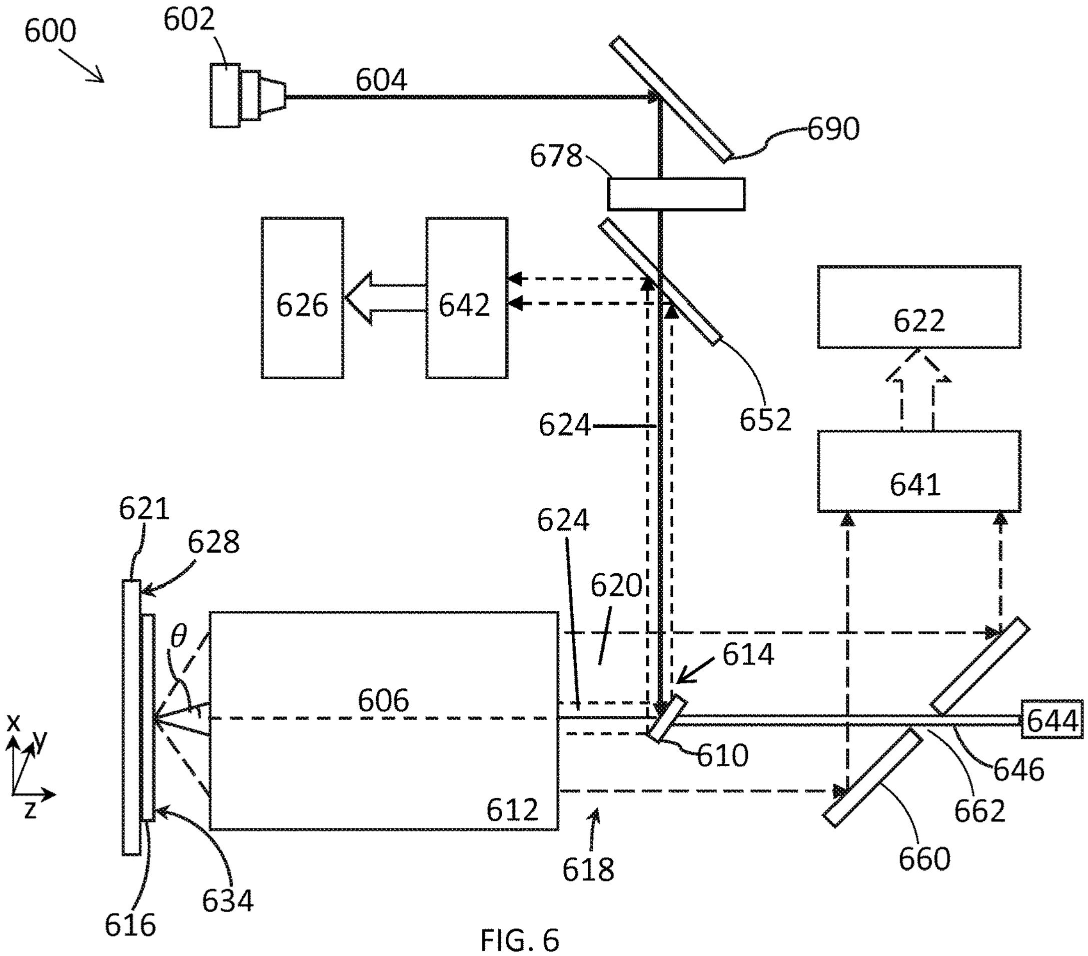
FIG. 6 is a simplified schematic of an inspection system, according to some embodiments of the disclosure.

FIG. 6 is a simplified schematic of an inspection system 600, according to some embodiments of the disclosure.

In some embodiments, system 600 includes one or more element of system 100 FIGS. 1A-D, where like elements have like numbers e.g. element 602 corresponding to element 102.

In some embodiments, a holder 646 extends in a direction of an optical axis 606 of objective 612 and/or a direction of reflected light 618 and/or a direction of DF light 620.

Where, in some embodiments, holder 646 extends through an element 660 which is configured to direct DF light 620 towards DF detection element/s 641, 622. Where, in some embodiments, element 660 includes a mirror. In some embodiments holder 646 extends through a hole 662 in mirror 660. Where, in some embodiments, hole 662 is sized and/or shaped to allow actuator 644 to adjust position of coupling mirror 610 e.g. via movement of holder.

For example, where diffraction of DF light 620 after passing separator 610 extends DF light 620 towards holder 646, in some embodiments, holder 646 includes (e.g. is formed from) transparent material (e.g. glass). In some embodiments, holder 646 includes an anti-reflective coating. In some embodiments, a cross sectional area and/or refractive properties of holder 646 are selected to prevent total internal reflection of DF light which enters the holder e.g. holder having a rectangular shaped cross section. A potential benefit of these feature/s being maximal passage of DF light through the holder and therefrom to detection.

Figure 7:
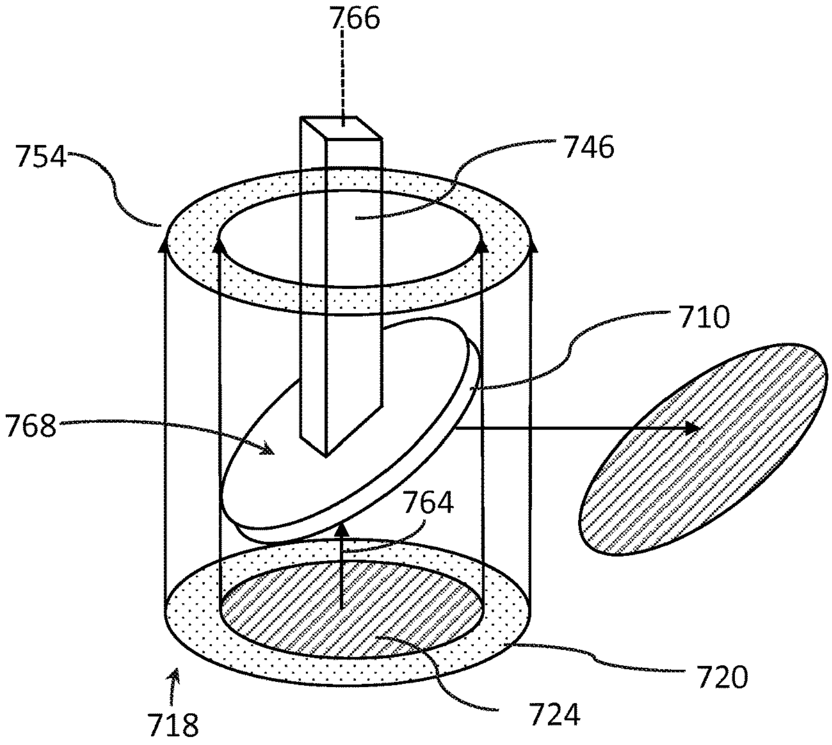
FIG. 7 is a simplified schematic of an embodiment of a portion of an inspection system, according to some embodiments of the disclosure.

FIG. 7 is a simplified schematic of an embodiment of a portion of an inspection system, according to some embodiments of the disclosure.

Illustrated in FIG. 7 are a coupling mirror 710 and a holder 746 for the coupling mirror. In some embodiments, FIG. 7 illustrates interaction between reflected light 718 where coupling mirror 710 separates bright field (BF) light 734, and dark field (DF) light 720. Where, in some embodiments, DF light 720 passes around coupling mirror 710 and BF light is directed away from a direction 764 of propagation of reflected light 718.

In some embodiments, FIG. 7 illustrates a three dimensional view of a portion of FIG. 6, coupling mirror 610 and holder 646 FIG. 6 corresponding to, respectively, coupling mirror 710 and holder 746 FIG. 7.

In some embodiments, holder 746 is disposed extending in a direction of propagation of reflected 718 and DF light 720. Where, potentially positioning of holder 746 does not block either BF light 724 or DF light 720.

In some embodiments, FIG. 7 corresponds to a configuration of coupling mirror 110 and holder 146 FIG. 1A. Where, referring back to FIG. 1A, in some embodiments, holder 746 passes through a hole 762 in DF mirror 760 e.g. to couple to actuator/s 744.

Figure 8A:
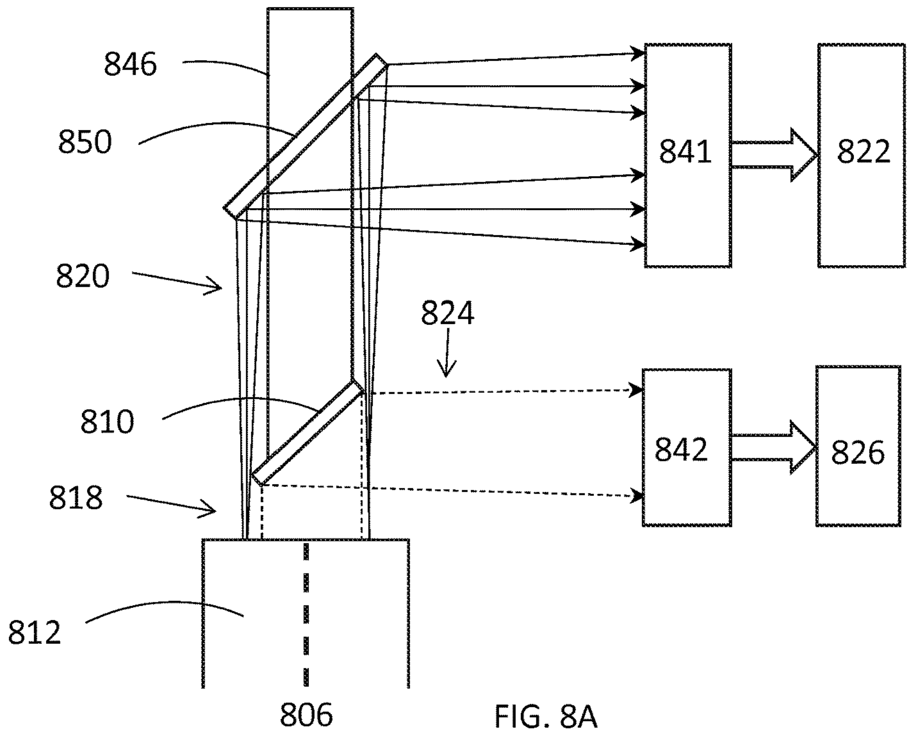
FIG. 8A is a simplified schematic of an inspection system, according to some embodiments of the disclosure.

FIG. 8A is a simplified schematic of a portion of an inspection system 800, according to some embodiments of the disclosure.

Figure 8B:
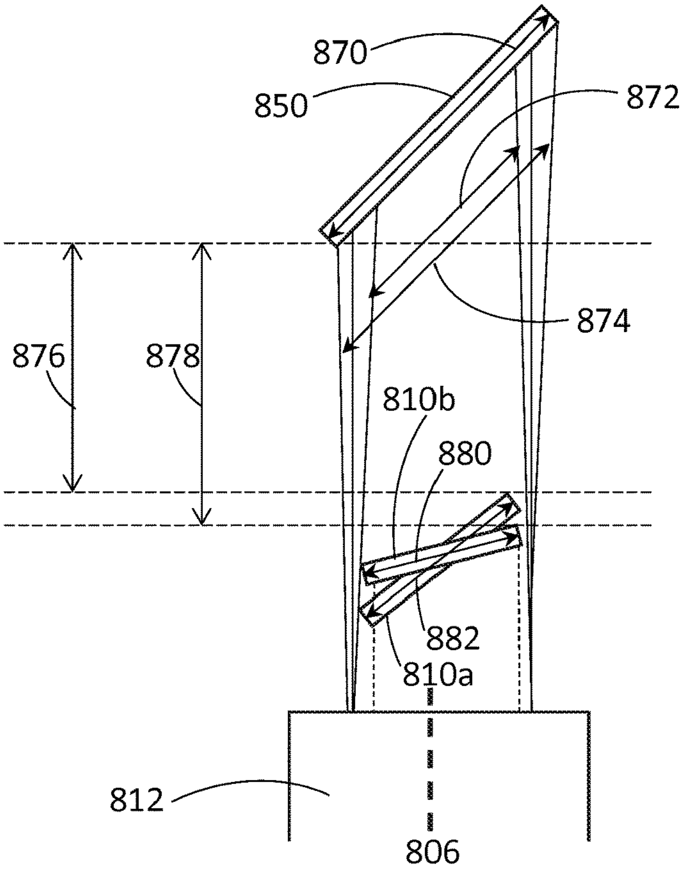
FIG. 8B is a simplified schematic of an inspection system, according to some embodiments of the disclosure.

FIG. 8B is a simplified schematic of a portion of an inspection system 800, according to some embodiments of the disclosure.

FIGS. 8A-B illustrate principal rays of DF light 820 illustrating broadening thereof with distance away from objective lens arrangement 812.

In some embodiments, system 800 includes one or more element of system 100 FIGS. 1A-D, where like elements have like numbers e.g. element 812 corresponding to element 112.

FIGS. 8A, in some embodiments, illustrate an embodiment where both BF light 824 and DF light 820 are directed away from a direction of reflected light 818 and/or an optical axis 806 of objective 812. Where, in some embodiments, BF light 824 is directed by coupling mirror 810 and DF light 824 is directed by mirror 850.

FIG. 8B, in some embodiments, illustrates different coupling mirror orientations, for both different embodiments, with different orientations of a coupling mirror 810*a*, 810*b* and/or for an embodiment where coupling mirror orientation is adjustable (e.g. change in orientation as effected by movement of a holder) where mirror 810*a* has a larger angle to an optical axis 806 of object 812 than mirror 810*b*.

Potentially, for separation of BF light 824 and DF light 820, coupling mirror 810*b* at a lower angle has a shorter length 880 than a length 882 of coupling mirror 810*a*.

Potentially, for lower angle orientation coupling mirror 810*b*, a separation distance 876 required between coupling mirror 810*b* and mirror 850 is smaller e.g. than a separation distance 878 required between coupling mirror 810*a* and mirror 850.

Potentially, reducing distance between mirror 850 and the coupling mirror enables reduction in size of mirror 850 e.g. as illustrated by arrow 874.

Figure 9:
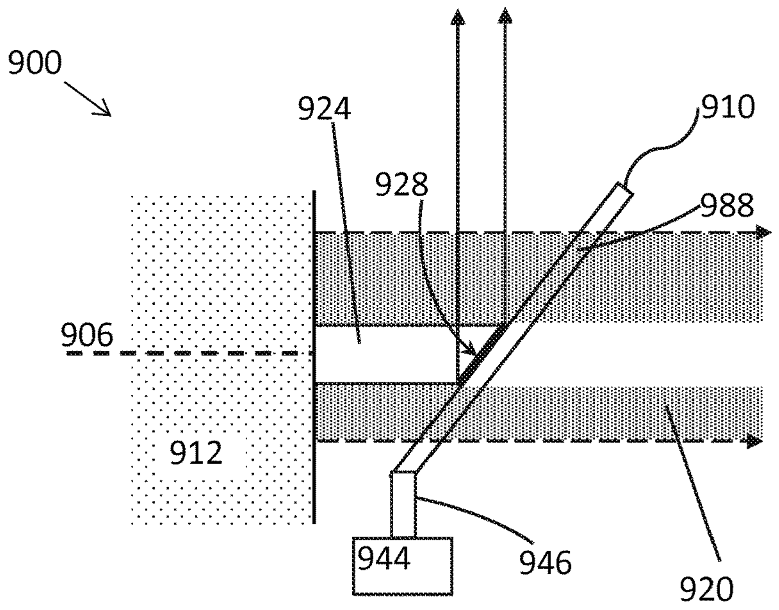
FIG. 9 is a simplified schematic of an inspection system, according to some embodiments of the disclosure.

FIG. 9 is a simplified schematic of a portion of an inspection system 900, according to some embodiments of the disclosure.

In some embodiments, a coupling mirror 910 includes a reflective surface 928 configured to direct BF light 924 received from an objective lens arrangement 912 away from an optical axis 906 of the objective lens arrangement (e.g. towards brightfield detection element/s which are not illustrated in FIG. 9).

In some embodiments, coupling mirror 910 includes one or more transmissive portion 988. Where transmissive portion/s 988 are configured to allow passage therethrough of DF light 920 received from objective lens arrangement 912.

In some embodiments, transmissive portion/s 988 are disposed around reflective surface 928 e.g. in an annular arrangement.

In some embodiments, a portion of coupling mirror extends outside a region of space inhabited (or potentially inhabited) by DF light 920.

Where, in some embodiments, coupling mirror 910 is held in position by a holder 946 which is coupled to coupling mirror 910 outside the region of space of DF light 920.

Alternatively, holder 946, in some embodiments, extends into the region of space of DF light. Where, in some embodiments, holder 946 includes transparent material, and optionally, an anti-reflective surface (e.g. provided by a coating). Holder 946, in some embodiments, at least for a portion of (e.g. all) of a region of the holder disposed (or disposable by movements of actuator 944) in a region of space receiving DF light, is formed of transparent material optionally having an anti-reflective surface. In some embodiments, at least for a portion of (e.g. all) of the region the transparent portion/s of holder 946 are sized and/or shaped and/or have refractive properties selected to prevent or minimize total internal reflection of DF light within holder 946.

Optionally, in some embodiments, system 900 includes one or more actuator 940 configured to adjust position and/or angle of coupling mirror 910.

Figure 10:
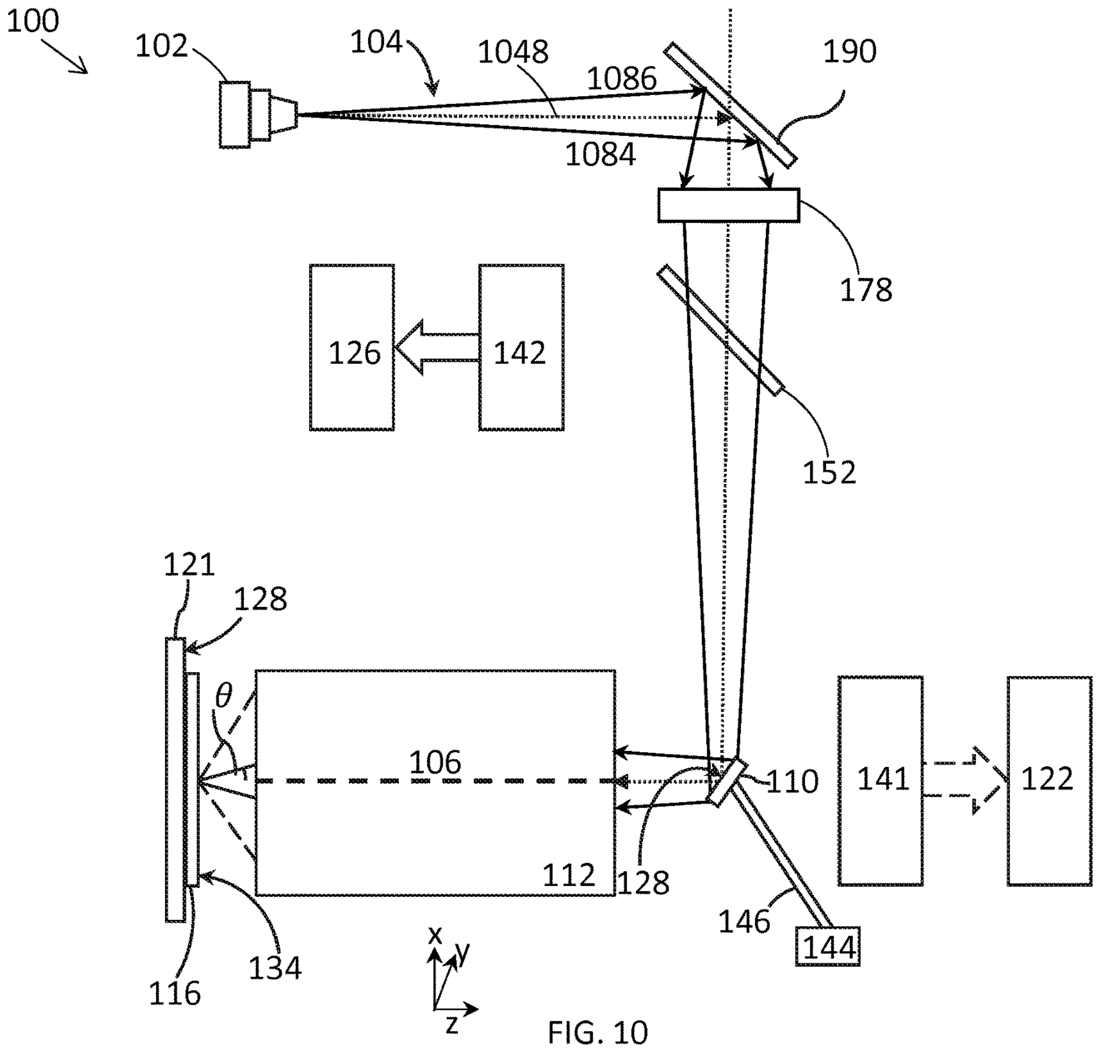
FIG. 10 is a simplified schematic of an inspection system, according to some embodiments of the disclosure.

FIG. 10 is a simplified schematic of an inspection system 100, according to some embodiments of the disclosure.

In FIG. 1A illumination light 104 was illustrated (e.g. simplified) as emanating from a point source 102. FIG. 10, in some embodiments, illustrates (e.g. regarding the system of FIG. 1A) illumination light 104 as having a field of view (FOV) e.g. as illustrated by central ray 1048 and extreme rays 1084, 1086.

FIG. 10 further illustrates relaying (e.g. by a relay module 178 which includes one or more optical elements e.g. one or more lens) of illumination light 104 (e.g. an image of illumination light to position a virtual exit pupil of light source 102) at reflective surface 128 of separator 110.

FIG. 11 is a simplified schematic cross section of a portion of an inspection system 1100, according to some embodiments of the disclosure.

In some embodiments, system 1100 includes a light source 1102 which, in some embodiments, includes one or more feature as illustrated in and/or described regarding light source 102 FIG. 1A, light source 202 FIG. 2, light source 602 FIG. 6, light source 102 FIG. 10 (and/or is suitable for used as).

In some embodiments, system 1100 includes a coupling mirror 1110, which, in some embodiments, includes one or more feature as illustrated in and/or described regarding coupling mirrors as described elsewhere in this document.

In some embodiments, system 1100 includes one or more element of system FIG. 1, FIG. 2, FIG. 6, FIG. 10, which are, for example, for simplicity of illustration, omitted from FIG. 11.

In some embodiments, a pupil 1182 of light source 1102 has a cross sectional area and shape. FIG. 11, in some embodiments, illustrates modeling such light, as it is focused by a relay module 1178 to position an effective pupil of the illumination light at reflective surface 1128 of coupling mirror 1110.

In some embodiments, illumination light 1140 is modeled as a plurality of solid shapes, two of which 1184, 1186 are schematically illustrated in FIG. 11.

Exemplary Method of Separator Reflective Surface Design

FIG. 12 is a method of coupling mirror window design, according to some embodiments of the disclosure.

At 1200, in some embodiments, illumination parameters are received.

In some embodiments, the illumination parameters include a shape of a light source pupil through which illumination passes into the system, the pupil defining a shape of the illumination light.

In some embodiments, the illumination parameters include quantification of shape of the light and/or light FOV with distance from the light source pupil, in some embodiments described using field angles of the illumination light. Where field angles are defined, in some embodiments, as angles of extreme rays with respect to a central optical axis of the illumination.

In some embodiments, e.g. where the light is symmetrical around the central optical axis, the shape of light and/or light FOV with distance from the light source pupil is quantified by a single field angle.

In some embodiments, e.g. where the light is symmetrical about two axes perpendicular to the light source pupil (or is simplified as being such), the shape of the light and/or light FOV with distance from the light source pupil is quantified a two field angles, one angle for each of the two perpendicular directions. For example, referring to FIG. 13A and FIG. 13B where the central optical axis is parallel to a z-direction and the two field angles are θx and θy.

In some embodiments, more than two field angles are used to quantify the light, e.g. where an angular extent with respect to the light source pupil is provided with each angle e.g. where field angle is described as with respect to (e.g. as a function of position of) extreme ray emergence from the light source pupil.

Where, in a scanning illumination system, the field angles describe the most extreme angled light beams when scanning e.g. the field angles describing the FOV of the scanning illumination system.

Where, in an aerial illumination system, in some embodiments, field angles are defined as angles defining a region of space extending from the entrance pupil in which in which the system (e.g. the light source and/or objective) conform to one or more optical performance requirement. Exemplary requirements including one or more of a maximal wavefront error, field distortion, image uniformity, and telecentricity.

In some embodiments, the region of defined by the field angles is considered to be the FOV of the system.

At 1202, in some embodiments coupling mirror parameters are received. For example, including an angle of the mirror with respect to other element/s of the inspection system. For example, a distance between the mirror and other element/s of the inspection system, for example, a pupil relief distance between the coupling mirror and objective lens arrangement e.g. pupil relief 132 distance FIG. 1A. For example, including mirror material and/or optical parameter/s.

At 1204, in some embodiments, the illumination is modeled. For example, using a plurality of solid shapes each solid shape modeling an extremity of the illumination light.

Where, in some embodiments, a solid shape is modeled for two opposing extremities for two directions perpendicular to a central optical axis of the illumination. For example, according one or more feature as illustrated and/or described regarding FIGS. 13C-E.

In some embodiments, e.g. when light shape is quantified by more than two field angles, more than two solid shapes are used to model the light e.g. a solid shape for each field angle and/or corner of a shape of the light source pupil (e.g. a pentagon shaped light source, in some embodiments, being modeled by 5 solid shapes).

At 1206, in some embodiments, an overlapping volume between the coupling mirror reflective surface and the illumination is determined using the coupling mirror parameters and the illumination model.

At 1208, in some embodiments, a coupling mirror reflective surface is designed, using the intersection surface are. Where, in some embodiments, the reflective surface is formed (e.g. the coupling mirror is cut to shape, e.g. a reflective material is deposited onto coupling mirror) according to the design.

Exemplary Illumination Modeling

Figure 13A:
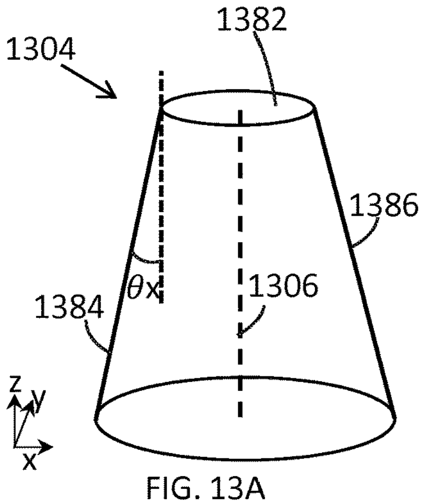
FIGS. 13A-B are simplified schematics of illumination light, according to some embodiments of the disclosure.
Figure 13B:
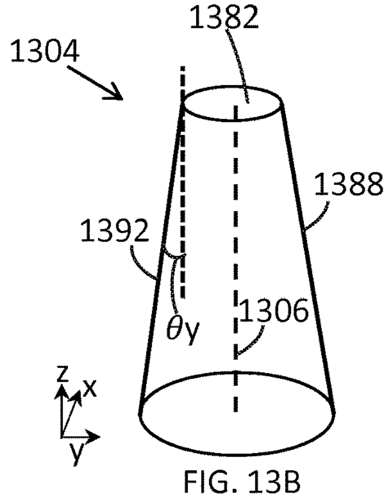

FIGS. 13A-B are simplified schematics of illumination light 404, according to some embodiments of the disclosure.

FIG. 13A and FIG. 13B, in some embodiments, illustrate different views of exemplary illumination light 1304 and/or (e.g. in the case of scanning illumination) illumination light FOVs 1304. Light emanates from pupil 1382, where an optical central axis 1306 of the light (and/or light FOV) is parallel to a z-axis. Extreme rays 1384, 1386 in an x-direction are illustrated, where a field angle θx in the x-direction is taken between extreme ray/s 1384, 1386 and central optical axis 1306 of the illumination light. Extreme rays 1384, 1386 in an y-direction are illustrated where a field angle θy in the y-direction is taken between extreme ray/s 1392, 1388 and optical axis 1306.

Figure 13C:
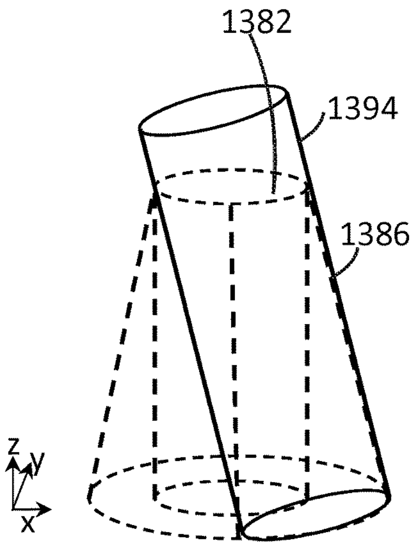

FIGS. 13C-4D illustrate modeling of illumination light, according to some embodiments of the disclosure.

Figure 13D:
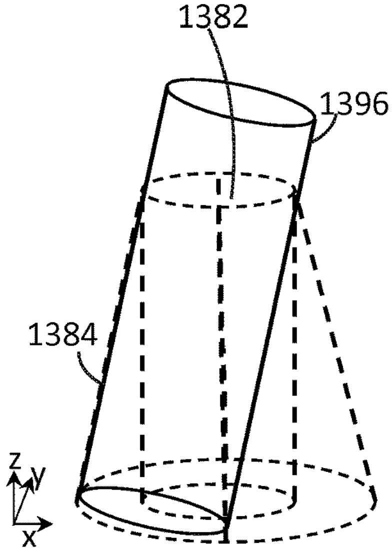

In FIGS. 13C-D, both illumination light and/or (e.g. in the case of scanning illumination) illumination light FOVs are illustrated with dashed lines and a solid shape having a same cross section as pupil 1382 and aligned with the central optical axis 1306.

Modeling of light 1304 e.g. as described within this document is illustrated in FIGS. 13C-D by solid shapes 1394 FIG. 13C, 1396 FIG. 13D having cross section of pupil 1386, and extending from pupil 1386 along a direction of x-direction marginal rays 1386 FIG. 13C, 1384 FIG. 13D.

Figure 13E:
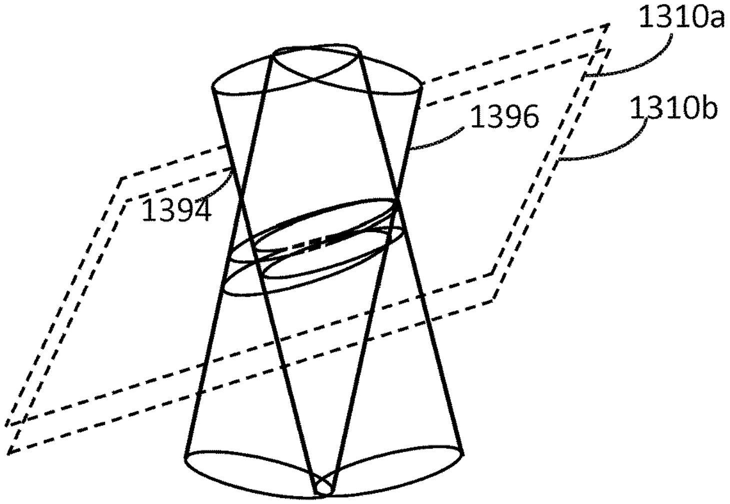
FIG. 13E illustrates modeling of an overlap surface area, according to some embodiments of the disclosure.

FIG. 13E illustrates modeling of an overlap surface area, according to some embodiments of the disclosure.

In FIG. 13E illustrated are solid volumes 1394, 1396 modeling x-axis direction light extremities, as overlapping with two exemplary coupling mirror reflective surfaces 1310*a*, 1310*b*. In some embodiments, modeling of light 1302 includes determining a solid volume for each extremity of the light (e.g. two additional solids modelling y-axis extremities of the light), where the overlap of the solids (e.g. four solids) and coupling mirror is used to determine a reflective surface shape.

Figure 14A:
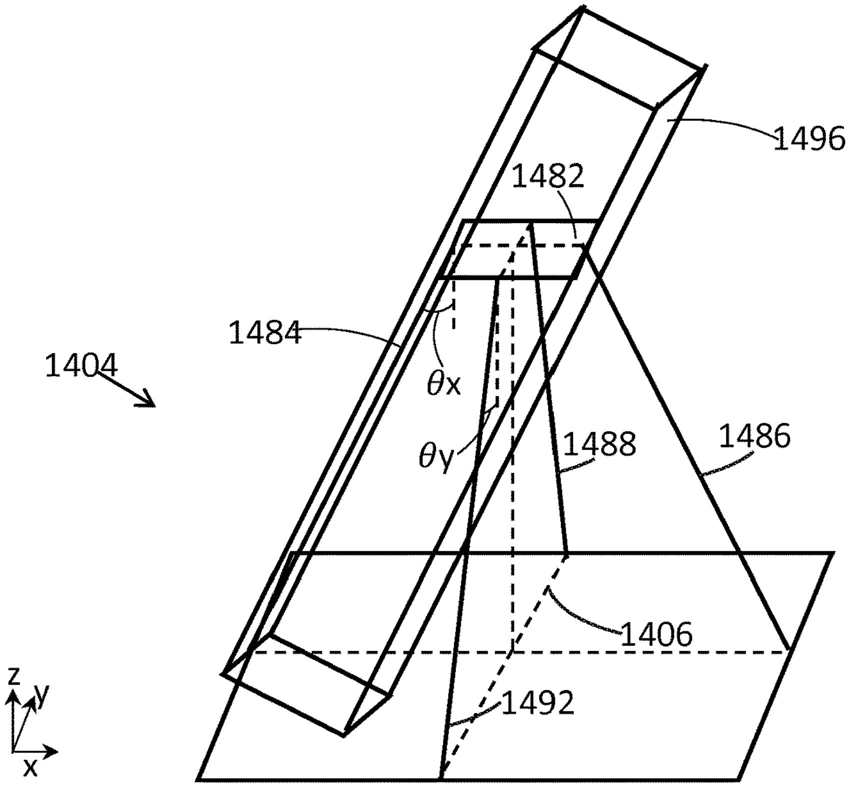
FIG. 14A is a simplified schematic of illumination light, according to some embodiments of the disclosure.

FIG. 14A is a simplified schematic of illumination light 1404, according to some embodiments of the disclosure.

Illustrated in FIG. 14A are a rectangular shaped illumination pupil 1482, light 1404 (and/or an FOV of illumination light, where the term "light" or "illumination light" should be understood to refer both to the light and an illumination FOV) having a central optical axis 1406 parallel to a z-axis. Where light 1404 has x-axis extreme rays 1484, 1486, and y-axis extreme rays 1488, 1492.

Although illustrated in this document are circular and rectangular illumination pupil cross sections, other shapes are envisioned and encompassed by the current disclosure. For example, oval cross section, cross sections with larger numbers of edges and/or corners e.g. pentagon, hexagon. For example, irregular shapes. Where, in some embodiments, modeling of such shapes includes determining solids having cross section of the pupil cross section, orientated in directions of differing and/or extreme field angles.

Illustrated in FIG. 14A is modeling of illumination light using a solid 1496 having cross sectional shape of entrance pupil 1482 and orientated in alignment with extreme ray 1484.

Figure 14B:
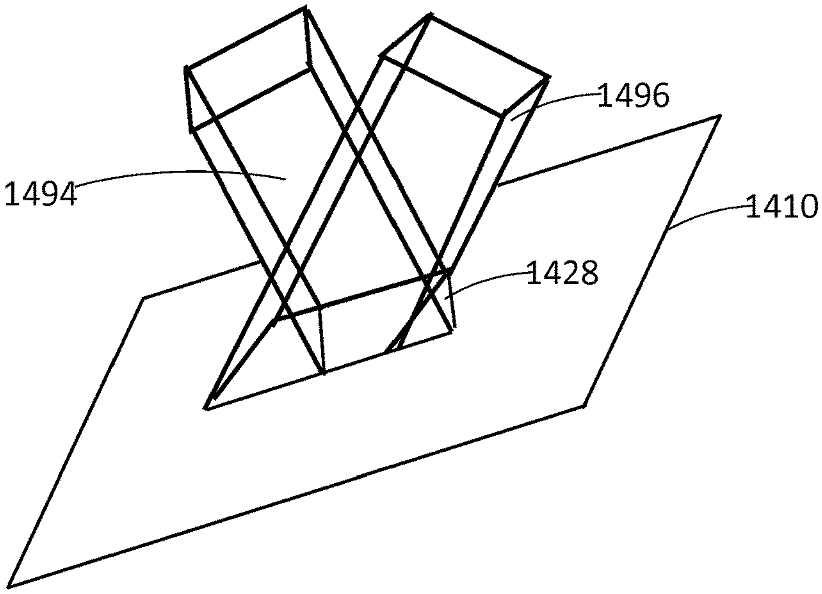
FIG. 14B illustrates modeling of an overlap surface area, according to some embodiments of the disclosure.

FIG. 14B illustrates modeling of an overlap surface area 1428, according to some embodiments of the disclosure.

In FIG. 14B illustrated are solid volumes 1494, 1496 modeling x-axis direction light extremities, as overlapping with a plane delineating position of a reflective surface of coupling mirror 1410. In some embodiments, modeling of light 1402 includes determining a solid volume for each extremity of the light (e.g. two additional solids modelling y-axis extremities of the light), where the overlap of the solids (e.g. four solids) and surface 1410 is used to determine a shape of a reflective surface of a coupling mirror.

FIG. 15A is a simplified schematic illustrating modelling of illumination light as it interacts with a plane delineating position of a reflective surface of coupling mirror 1510, according to some embodiments of the disclosure.

FIG. 15B illustrates a shape at a surface plane 1534 of a plane delineating position of a reflective surface of coupling mirror 1510, according to some embodiments of the disclosure.

FIGS. 15A-15B illustrate modelling of illumination light which has symmetrical extent and where coupler 1510 is orientated perpendicular to a central optical axis 1504 of illumination.

FIG. 15A, in some embodiments, illustrates modeling of an extent of illumination light, as it interacts with plane 1510 as a plurality of solids 1538, 1540, 1542, 1544. Each of solids 1538, 1540, 1542, 1544 orientated along an extreme ray of the illumination light. Where, in the embodiment of FIG. 15A, solids 1538, 1540, 1542, 1544 are cylinders modeling light of an illumination source having a circular shape pupil.

FIG. 15B, in some embodiments, illustrates intersection of cylinders 1538, 1540, 1542, 1544 with a surface (e.g. top surface 1534 and/or bottom surface 1536) of plane 1510. Where, oval 1546, in some embodiments, corresponds with intersection of cylinders 1552, 1544. Where oval 1548, in some embodiments, corresponds with intersection of cylinders 1538, 1540. FIGS. 15A-B, in some embodiments, relate to an embodiment where field angles are symmetrical (e.g. referring back to FIGS. 13A-B, where θx and θy are equal). Where circle 1550 illustrates a smallest circular shape containing both of ovals 1546, 1548.

FIG. 16A is a simplified schematic illustrating an extent of illumination light as it interacts with a plane delineating position of a reflective surface of coupling mirror 1610, according to some embodiments of the disclosure.

FIG. 16B illustrates a shape 1628 at a surface plane of a plane delineating position of a reflective surface of coupling mirror 1610, according to some embodiments of the disclosure.

FIGS. 16A-16B illustrate modelling of illumination light which has symmetrical extent and where coupler 1610 is orientated perpendicular to a central optical axis 1604 of illumination.

FIG. 16A, in some embodiments, illustrates modeling of an extent of illumination light, as it interacts with plane 1610 as a plurality of cylinders 1638, 1640, 1642, 1644. Where, in the embodiment of FIG. 16A, solids 1638, 1640, 1642, 1644 are cylinders modeling light of an illumination source having a circular shape entrance pupil. Each of solids 1638, 1640, 1642, 1644 delineating a field angle of illumination light. Where, in FIG. 16A, illumination has different field angles in different directions, where θ1>θ2.

FIG. 16B, in some embodiments, illustrates intersection of cylinders 1638, 1640, 1642, 1644 with plane 1610.

Where, oval 1646, in some embodiments, corresponds with intersection of cylinders 1640, 1644 with plane 1610. Where oval 1648, in some embodiments, corresponds with intersection of cylinders 1642, 1644 with plane 1610. Where, in some embodiments, oval 1650 illustrates a smallest oval shape containing both of ovals 1646, 1648.

FIG. 17A is a simplified schematic illustrating modelling of illumination light as it interacts with a plane delineating position of a reflective surface of coupling mirror 1710, according to some embodiments of the disclosure.

FIG. 17B illustrates a shape 1728 at a surface plane of a plane delineating position of a reflective surface of coupling mirror 1710, according to some embodiments of the disclosure.

FIG. 17A-B, in some embodiments, illustrates an embodiment where illumination has the same features as the embodiment illustrated in FIGS. 6A-B (solids 1738, 1740, 1742, 1744 are cylinders according to a circular shaped illumination entrance pupil, field angles are symmetrical), but where a plane 1610 is positioned at an angle to an optical central axis 1704 of the illumination.

Referring to FIG. 17B ovals 1752, 1748, 1754, 1746, in some embodiments, corresponding with intersection of cylinders 1738, 1742, 1744, 1740 respectively. Where, in some embodiments, circle 1750 illustrates a smallest circular or ellipsoid shape containing all of ovals 1752, 1748, 1754, 1746.

Figure 18A:
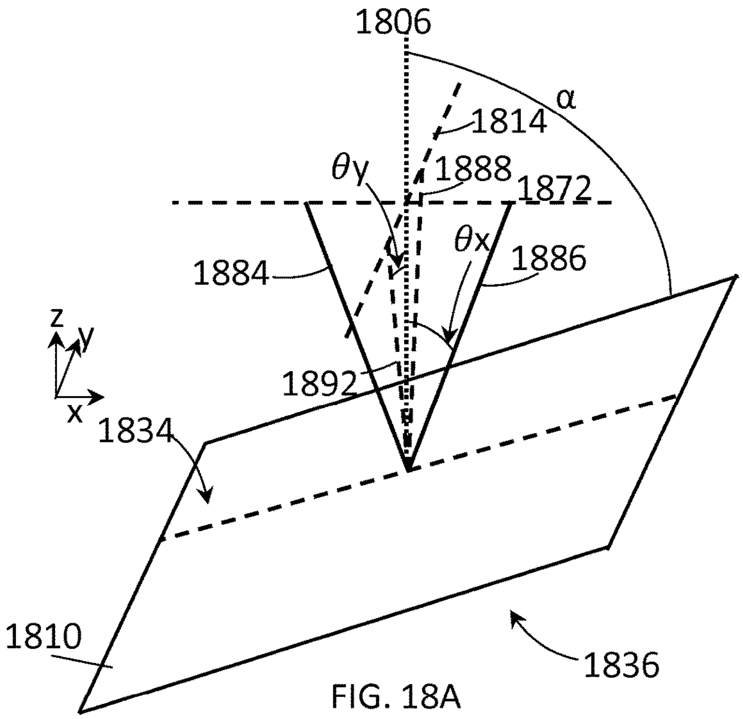
FIG. 18A is a simplified schematic illustrating an extent of illumination light as it interacts with a plane delineating position of a reflective surface of coupling mirror 910, according to some embodiments of the disclosure.

FIG. 18A is a simplified schematic illustrating an extent of illumination light as it interacts with a plane delineating position of a reflective surface of coupling mirror 1810, according to some embodiments of the disclosure.

Figure 18B:
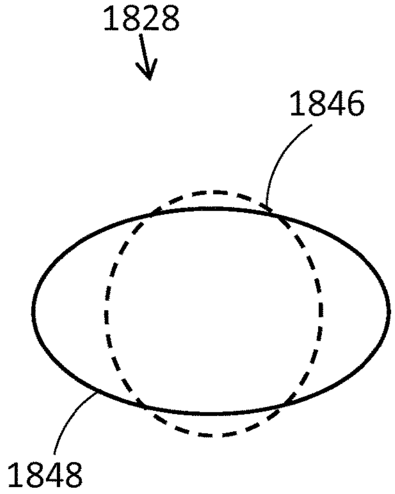
FIG. 18B illustrates a shape at a surface plane of a plane delineating position of a reflective surface of coupling mirror, according to some embodiments of the disclosure.

FIG. 18B illustrates a shape 1828 at a surface plane of a plane delineating position of a reflective surface of coupling mirror 1810, according to some embodiments of the disclosure.

Figure 19A:
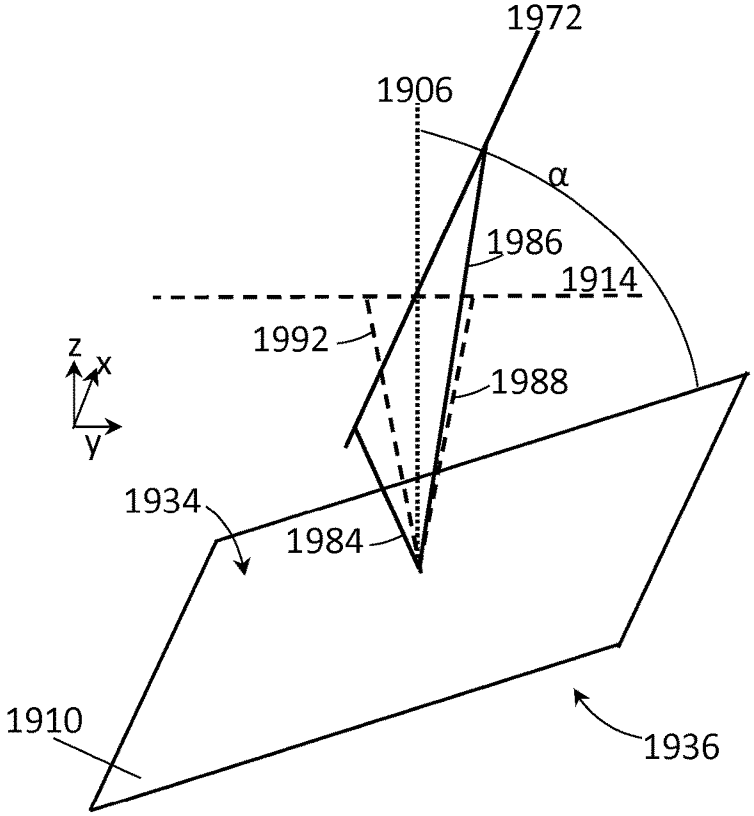
FIG. 19A is a simplified schematic illustrating an extent of illumination light as it interacts with a plane, according to some embodiments of the disclosure.

FIG. 19A is a simplified schematic illustrating an extent of illumination light as it interacts with a plane 1910, according to some embodiments of the disclosure.

Figure 19B:
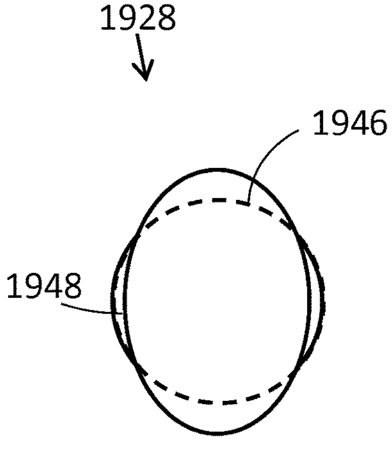
FIG. 19B illustrates a shape at a surface plane of a plane, according to some embodiments of the disclosure.

FIG. 19B illustrates a shape 1928 at a surface plane of a plane 1910, according to some embodiments of the disclosure.

In some embodiments, the plane is tilted in a single direction perpendicular to an optical axis of illumination or has a higher angle of tilt in one direction (perpendicular to an optical axis of illumination) than another. For example, referring to e.g. referring to FIG. 18A and FIG. 19A, in some embodiments plane 1810, 1910 is tilted in an x-direction and not (or is less tilted) in a y-direction where the optical axis 1806, 1906 is parallel to a z-direction.

In some embodiments, illumination has a larger extent and/or a higher field angle in e.g. in one direction than another. For example, referring back to FIG. 13A and FIG. 13B where θx is larger than θy.

FIG. 18A, in some embodiments, illustrates extreme rays of illumination light, where the illumination light is focused to top surface 1834 of plane 910. Where illustrated are a central optical axis 1806 and extreme rays 1884, 1886, 1892, 1888 of the illumination light in two directions; x-direction marginal rays 1884, 1886 and y-direction extreme rays 1892, 1888. Line 1872 is a line extending in the x-direction and intersecting central optical axis 1806. Line 1814 is a line extending in the y-direction and intersecting central optical axis 1806.

FIG. 18A and FIG. 19A, in some embodiments, illustrate asymmetrical illumination where θx is larger than θy. In some embodiments, plane 1810, 110 is at an angle α (e.g. plane 1810 is tilted) with respect to central optical axis 1806, 1906 of the illumination light.

FIG. 18A and FIG. 19A, in some embodiments, illustrate a same illumination and a same plane, where an orientation of the illumination is rotated by 90 degrees with respect to the mirror (or equally vice versa). Where, in FIG. 18A, the larger field angle θx of the illumination is aligned with the tilting of plane 1810 and in FIG. 19, the smaller field angle θy of the illumination is aligned with tilting of plane 1910.

FIG. 18B and FIG. 19B illustrate intersections between modeled illumination light and the plane for orientation of the illumination with respect to the plane as illustrated respectively in FIG. 18A and FIG. 19B.

Where intersection of a single cylinder in each direction is illustrated, for simplicity, as, in some embodiments, the cylinder at a smaller angle to the mirror surface is associated with a larger intersection shape on the mirror surface, for example, referring to FIG. 18B, intersection of a cylinder orientated to extreme ray 1886 is larger than that of a cylinder orientated to extreme ray 1884.

Referring to FIG. 18B, in some embodiments, oval 1846 corresponds to cylinders orientated to extreme rays 1892 and 1888, oval 1848 corresponds to a cylinder orientated to 1886.

Referring to FIG. 19B, in some embodiments, oval 1946 corresponds to cylinders orientated to extreme ray 1988, oval 1948 corresponds to cylinders orientated to extreme rays 1984, 1986.

General

As used within this document, the term "about" refers to±20%

The terms "comprises", "comprising", "includes", "including", "having" and their conjugates mean "including but not limited to".

The term "consisting of" means "including and limited to".

As used herein, singular forms, for example, "a", "an" and "the" include plural references unless the context clearly dictates otherwise.

Within this application, various quantifications and/or expressions may include use of ranges. Range format should not be construed as an inflexible limitation on the scope of the present disclosure. Accordingly, descriptions including ranges should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within the stated range and/or subrange, for example, 1, 2, 3, 4, 5, and 6. Whenever a numerical range is indicated within this document, it is meant to include any cited numeral (fractional or integral) within the indicated range.

It is appreciated that certain features which are (e.g. for clarity) described in the context of separate embodiments, may also be provided in combination in a single embodiment. Where various features of the present disclosure, which are (e.g. for brevity) described in a context of a single embodiment, may also be provided separately or in any suitable sub-combination or may be suitable for use with any other described embodiment. Features described in the context of various embodiments are not to be considered essential features of those embodiments, unless the embodiment is inoperative without those elements.

Although the present disclosure has been described in conjunction with specific embodiments thereof, it is evident that many alternatives, modifications, and variations will be apparent to those skilled in the art. Accordingly, this application intends to embrace all such alternatives, modifications and variations that fall within the spirit and broad scope of the appended claims.

All references (e.g. publications, patents, patent applications) mentioned in this specification are herein incorporated in their entirety by reference into the specification, e.g. as if each individual publication, patent, or patent application was individually indicated to be incorporated herein by reference. Citation or identification of any reference in this application should not be construed as an admission that such reference is available as prior art to the present disclosure. In addition, any priority document(s) and/or documents related to this application (e.g. co-filed) are hereby incorporated herein by reference in its/their entirety.

Where section headings are used in this document, they should not be interpreted as necessarily limiting.

What is claimed is:

1. A system for scanning a surface of an inspection object comprising:
- an illumination system providing an inspection light for illumination of a field of view (FOV) on said inspection object to produce a reflected light beam from said inspection object;
- an objective lens arrangement, located between said illumination system and said surface of said inspection object, the objective lens arrangement configured to:
  - receive and transfer said inspection light to said inspection object; and
  - collect light reflected off a plurality of field points on said inspection object to form and inwardly transmit said reflected light beam from the collected light;
- a light separator:
  - having a reflective surface arranged:
    - to direct said inspection light towards said FOV; and
    - to receive and change a direction of brightfield light comprising a central portion of said reflected light beam; and
  - sized and shaped to allow therearound darkfield light comprising a peripheral portion of said reflected light beam; and a holder configured to provide mechanical support to said light separator, having a first portion attached to said light separator and a second portion extending away from said light separator.

2. The system according to claim 1, wherein said reflective surface is disposed at a front side of said light separator, wherein said holder is attached at a back side of said light separator.

3. The system according to claim 2, wherein said second portion is coupled to an actuator configured to move said holder to move said light separator to change one or more of a position of said light separator and an orientation of said light separator, where said actuator is positioned outside a region of space occupied by said darkfield light.

4. The system according to claim 1, wherein said holder extends away from said light separator in a direction parallel to a central optical axis of said darkfield light.

5. The system according to claim 1, wherein said holder is sized and shaped and positioned such that the holder is entirely contained within a three dimensional volume occupied by said darkfield light after said darkfield light passes around said light separator.

6. The system according to claim 5, comprising a darkfield channel reflector configured to direct said darkfield light towards a darkfield light detection unit, which reflector having a contained region contained by a darkfield region of said reflector which is illuminated by said darkfield light;

wherein said second portion of said holder includes a portion disposed at said contained region.

7. The system according to claim 6, wherein said darkfield channel reflector comprises a channel therethrough disposed at said contained region;

wherein said holder extends through said channel, said second portion extending through said darkfield channel reflector.

8. The system according to claim 7, wherein an angle of said light separator is a minimal angle which directs said brightfield light on an unobscured path towards a brightfield detector.

9. The system according to claim 1, wherein said holder is elongate having a central longitudinal axis disposed at a non-perpendicular angle to said reflective surface of said light separator.

10. The system according to claim 1, wherein said holder is elongate having a central longitudinal axis is aligned with an orientation of said reflective surface of said light separator.

11. The system according to claim 1, wherein said light separator has a body where said body tapers in a direction away from said reflective surface.

12. The system according to claim 1, wherein said light separator comprises a body including:

a front surface which hosts said reflective surface;

a forward edge; and a back edge;

wherein said front surface of said separator is angled with respect to said objective lens arrangement, to position said front surface closer to said objective lens arrangement than said back edge;

wherein said forward edge is angled away from said front surface, an angle of said forward edge to said front surface being less than 90 degrees.

13. The system according to claim 1, wherein said holder comprises transmissive material.

14. The system according to claim 13, wherein said holder extends around said reflective surface so darkfield light passes through said transmissive material of said holder.

15. The system according to claim 14, wherein said light separator and holder are formed of a sheet of transmissive material, where a portion of said sheet hosts reflective material to form said reflective surface.

16. The system according to claim 1, wherein said reflective surface has a shape defined by a geometric intersection between;

a three-dimensional model of said inspection light, and a plane corresponding to said reflective surface.

17. The system according to claim 16, comprising a relay module configured to relay a light source pupil to said reflective surface;

wherein said illumination system has:

a field of view (FOV);

the light source pupil having a size and a shape;

a central optical axis; and one or more field angle defining a shape of said FOV extending away from said light source pupil; and wherein said model includes a plurality of solids each solid having a cross section of said light source pupil and angled to a field angle of said one or more field angle.

18. The system according to claim 17, wherein said reflective surface is enlarged from said geometric intersection, enlargement based on one or more tolerance.

19. The system according to claim 18, comprising:

an optical reflective microscope;

wherein said objective lens arrangement includes:

an objective; and a plurality of interchangeable telescopes coupled thereto to control a magnification and a numerical aperture of said optical reflective microscope, the objective lens arrangement being configured to collect light reflected off a plurality of field points on the surface and to inwardly transmit a light beam formed from the collected light, and wherein said one or more tolerance comprises one or more error associated with positioning of said interchangeable telescopes.

* * * * *